(12) United States Patent
Yoshino et al.

(10) Patent No.: US 10,908,478 B2
(45) Date of Patent: Feb. 2, 2021

(54) PHOTOMETRIC DEVICE, PHOTOMETRIC METHOD, PROGRAM, AND CAPTURING DEVICE

(71) Applicant: Sony Corporation, Tokyo (JP)

(72) Inventors: Tetsuma Yoshino, Tokyo (JP); Katsunari Oda, Kanagawa (JP); Shohei Sakaguchi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/482,599

(22) PCT Filed: Jan. 11, 2018

(86) PCT No.: PCT/JP2018/000463
§ 371 (c)(1),
(2) Date: Jul. 31, 2019

(87) PCT Pub. No.: WO2018/150768
PCT Pub. Date: Aug. 23, 2018

(65) Prior Publication Data
US 2020/0012171 A1 Jan. 9, 2020

(30) Foreign Application Priority Data
Feb. 20, 2017 (JP) ................ 2017-029078

(51) Int. Cl.
*H04N 5/235* (2006.01)
*G03B 7/00* (2014.01)
(Continued)

(52) U.S. Cl.
CPC .............. *G03B 7/003* (2013.01); *G02B 7/28* (2013.01); *G03B 13/36* (2013.01); *H04N 5/2353* (2013.01); *H04N 5/23212* (2013.01)

(58) Field of Classification Search
CPC ........ G03B 7/003; G03B 13/36; G03B 7/091; G02B 7/28; H04N 5/23212; H04N 5/2353; H04N 5/232127; H04N 5/2351
See application file for complete search history.

(56) References Cited

U.S. PATENT DOCUMENTS

| 5,488,428 A | 1/1996 | Akashi et al. |
| 6,370,262 B1 | 4/2002 | Kawabata |

(Continued)

FOREIGN PATENT DOCUMENTS

| JP | 2011-053378 A | 3/2011 |
| JP | 2011-095378 A | 5/2011 |

OTHER PUBLICATIONS

Extended European Search Report dated Jan. 30, 2020 for related European Application No. 18753713.9.

*Primary Examiner* — Mekonnen D Dagnew
(74) *Attorney, Agent, or Firm* — Michael Best & Friedrich LLP

(57) ABSTRACT

A subject region discrimination unit 11 discriminates a desired subject region on the basis of ranging information. A subject photometric region setting unit 12 performs image signal processing of the desired subject region that is discriminated by the subject region discrimination unit 11, and sets a photometric region corresponding to the subject region after the processing as a subject photometric region. A photometric value calculation unit 13 calculates a photometric value of the desired subject region by using a photometric value of the subject photometric region that is set by the subject photometric region setting unit 12. For this reason, it is possible to accurately acquire the photometric value with respect to the desired subject region, and it is possible to perform optimal exposure control with respect to (Continued)

the desired subject region by using the photometric value that is calculated by the photometric value calculation unit.

20 Claims, 18 Drawing Sheets

(51) Int. Cl.
  *G02B 7/28* (2006.01)
  *G03B 13/36* (2006.01)
  *H04N 5/232* (2006.01)

(56) References Cited

U.S. PATENT DOCUMENTS

| | | | | |
|---|---|---|---|---|
| 2011/0090369 A1* | 4/2011 | Yanagita | ............... | H04N 5/357 |
| | | | | 348/234 |
| 2012/0075503 A1* | 3/2012 | Akifusa | ............ | H04N 5/23219 |
| | | | | 348/231.99 |
| 2014/0293064 A1* | 10/2014 | Kimura | ............... | H04N 5/2351 |
| | | | | 348/169 |
| 2016/0173759 A1* | 6/2016 | Nakamura | ......... | H04N 5/23219 |
| | | | | 348/222.1 |
| 2018/0288316 A1* | 10/2018 | Shionoya | ............. | H04N 5/2355 |
| 2020/0065936 A1* | 2/2020 | Ueyama | ............... | H04N 5/2353 |

* cited by examiner

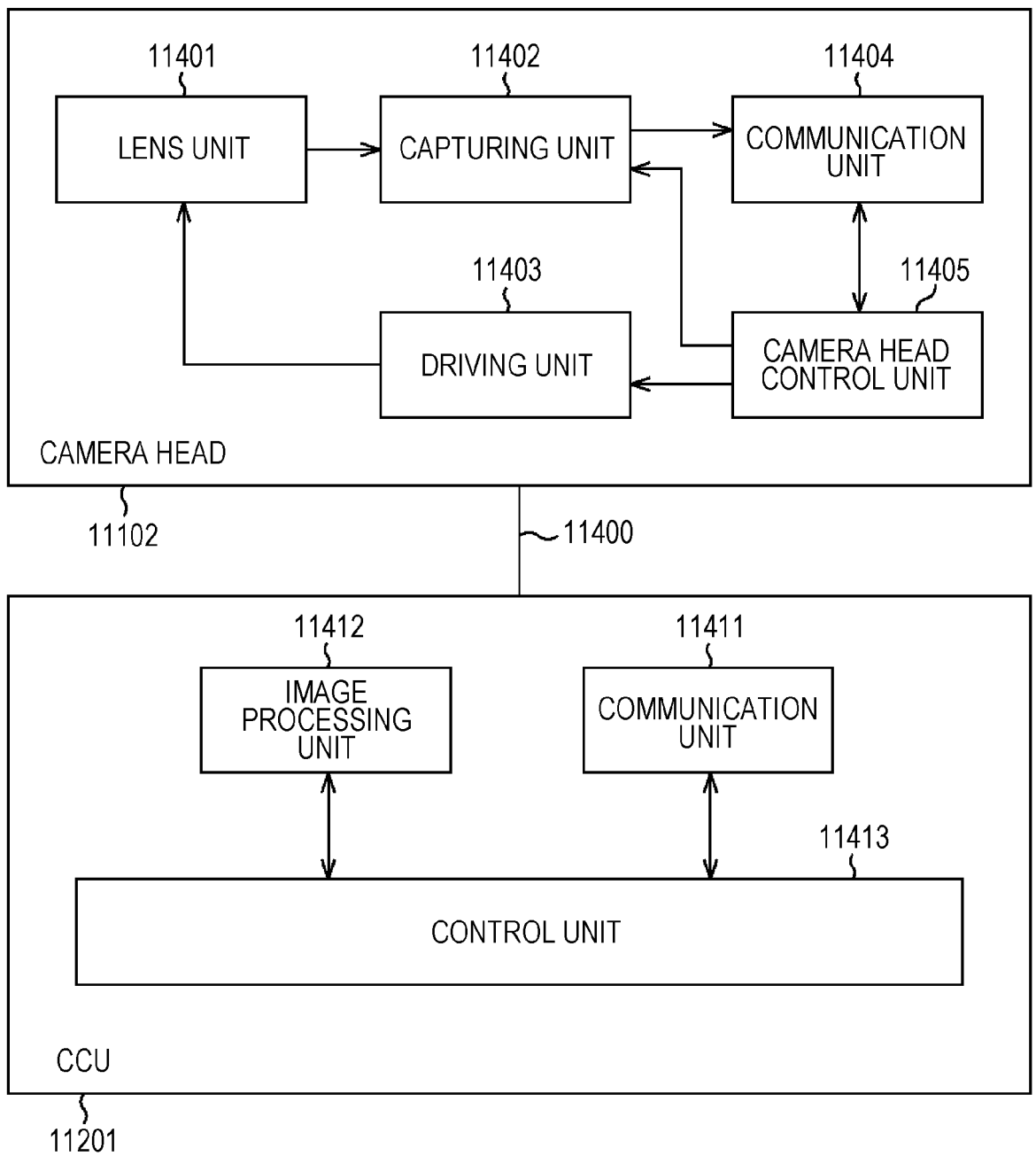

ed subject region. For example, the subject region discrimination unit discriminates one or a plurality of regions in a focusing state discriminated on the basis of the ranging information, as the desired subject region.

PHOTOMETRIC DEVICE, PHOTOMETRIC METHOD, PROGRAM, AND CAPTURING DEVICE

TECHNICAL FIELD

The present technology relates to a photometric device, a photometric method, a program, and a capturing device, and is capable of accurately acquiring a photometric value of a desired subject region.

BACKGROUND ART

In a capturing device of the related art, weighting with respect to a photometric value obtained by a photometric sensor in a position corresponding to a focal point detection region is performed on the basis of defocus amounts calculated in each of a plurality of focal point detection regions, and exposure control is performed on the basis of the photometric value after the weighting. For example, in Patent Document 1, weighting coefficients of a first photometric area provided in a position corresponding to a focal point detection area, and a second photometric area within a predetermined range are determined according to a defocus amount of the corresponding focal point detection area. In addition, it is described that a weighting coefficient of a third photometric area other than the first photometric area and the second photometric area is determined as a value less than or equal to the weighting coefficients of the first photometric area and the second photometric area, and exposure control is performed by using a photometric value that is obtained by performing a weighting arithmetic operation with the weighting coefficient and the photometric value.

CITATION LIST

Patent Document

Patent Document 1: Japanese Patent Application Laid-Open No. 2011-053378

SUMMARY OF THE INVENTION

Problems to be Solved by the Invention

However, as with Patent Document 1, in a case where the weighting is performed according to the defocus amount of the focal point detection area, there is a possibility that it is not possible to perform optimal exposure control according to a focusing position. For example, in the case of capturing a desired subject in the state of backlight or the like, a contrast method is used as focal point detection, and in a case where a boundary between the desired subject and the background is focused, the weight of the photometric value of the desired subject and the background increases, and thus, it is not possible to perform optimal exposure control according to the desired subject.

Therefore, an object of the present technology is to provide a photometric device, a photometric method, a program, and a capturing device in which it is possible to accurately acquire a photometric value of a desired subject region.

Solutions to Problems

A first aspect of the present technology relates to a photometric device, including: a subject region discrimination unit configured to discriminate a desired subject region on the basis of ranging information for each ranging region; a subject photometric region setting unit configured to set a subject photometric region by performing image signal processing of the subject region; and a photometric value calculation unit configured to calculate a photometric value of the desired subject region by using a photometric value of the subject photometric region set by the subject photometric region setting unit.

In the present technology, the subject region discrimination unit discriminates the subject region indicating the desired subject region, for example, one or a plurality of desired subjects on the basis of the ranging information for each of the ranging regions or a subject recognition result of a captured image including the desired subject. For example, the subject region discrimination unit discriminates one or a plurality of regions in a focusing state discriminated on the basis of the ranging information, as the desired subject region.

The subject photometric region setting unit covers the desired subject region by the image signal processing, and sets a photometric region corresponding to the subject region after the covering to the subject photometric region. For example, closing processing of the subject region is performed, and reduction processing is performed after performing expansion processing, and thus, the desired subject region is covered. Alternatively, in the image signal processing, replacement processing of setting a region having a number of regions of greater than or equal to a threshold value in which a peripheral region includes the subject region in a non-subject region not including the subject region, to the subject region is performed, and a photometric region corresponding to the subject region after the replacement processing is set to the subject photometric region. Alternatively, in the image signal processing, replacement processing of setting a non-subject region of less than or equal to a predetermined number of regions, the non-subject region being positioned between the subject regions in a predetermined direction and not including the subject region, to the subject region is performed, and a photometric region corresponding to the subject region after the replacement processing is set to the subject photometric region.

The photometric value calculation unit calculates a photometric value of the desired subject region by using a photometric value of the subject photometric region set by the subject photometric region setting unit. In addition, the photometric value calculation unit may perform weighting with respect to the photometric value of the subject photometric region according to a position in the subject photometric region, and weighting of setting the weight of a photometric value of a photometric region in which all peripheral photometric regions include a photometric region of the subject photometric region to be higher than that of other photometric regions. In addition, the photometric value calculation unit may perform weighting of setting the weight of a photometric value of a predetermined region range based on a photometric region corresponding to the ranging region designated in a case where a ranging region in a focusing state is designated to be high, weighting of setting the weight of a characteristic portion of the desired subject to be high with respect to the photometric value of the subject photometric region on the basis of a subject recognition result of the captured image including the desired subject, for example, weighting of discriminating a face region and of setting the weight of a characteristic portion of the face to be high, and the like. The photometric value calculation unit calculates the photometric value of the desired subject region by using the photometric value after the weighting.

A second aspect of the present technology relates to a photometric method, including: allowing a subject region discrimination unit to discriminate a desired subject region on the basis of ranging information; allowing a subject photometric region setting unit to set a subject photometric region by performing image signal processing of the discriminated desired subject region; and allowing a photometric value calculation unit to calculate a photometric value of the desired subject region by using a photometric value of the subject photometric region set by the subject photometric region setting unit.

A third aspect of the present technology relates to a program for allowing a computer to execute calculation of a photometric value, the program allowing the computer to execute: a step of discriminating a desired subject region on the basis of ranging information; a step of setting a subject photometric region by performing image signal processing of the desired subject region; and a step of calculating a photometric value of the desired subject region by using a photometric value of the set subject photometric region.

Furthermore, the program of the present technology, for example, is a program that is capable of being provided to a general-purpose computer that is capable of executing various programs and codes by a storage medium provided in a computer-readable format, a communication medium, for example, a storage medium such as an optical disk or a magnetic disk, and a semiconductor memory, or a communication medium such as a network. Such a program is provided in the computer-readable format, and thus, processing according to a program is realized on a computer.

A fourth aspect of the present technology relates to a capturing device, including: a photometric unit configured to generate photometric information indicating a photometric result for each photometric region; a ranging unit configured to generate ranging information indicating a ranging result for each ranging region; a subject region discrimination unit configured to discriminate a desired subject region on the basis of the ranging information for each of the ranging regions generated by the ranging unit; a subject photometric region setting unit configured to set a subject photometric region by performing image signal processing of the desired subject region; a photometric value calculation unit configured to calculate a photometric value of the desired subject region by using a photometric value of the subject photometric region set by the subject photometric region setting unit; a full-screen photometric value calculation unit configured to calculate a photometric value of a full screen from the photometric information indicating the photometric result for each of the photometric regions; and an exposure control unit configured to perform exposure control on the basis of the photometric value of the desired subject region calculated by the photometric value calculation unit and the photometric value of the full screen calculated by the full-screen photometric value calculation unit.

Effects of the Invention

According to the present technology, the desired subject region is discriminated by the subject region discrimination unit on the basis of ranging information, the image signal processing of the discriminated desired subject region is performed, and the subject photometric region is set by the subject photometric region setting unit. In addition, the photometric value of the desired subject region is calculated by the photometric value calculation unit by using the photometric value of the subject photometric region set by the subject photometric region setting unit. Therefore, it is possible to accurately acquire the photometric value of the desired subject region, and thus, it is possible to perform optimal exposure control according to the desired subject by using the photometric value that is calculated by the photometric value calculation unit. Furthermore, the effects described herein are merely illustrative, are not limited, and may have additional effects.

BRIEF DESCRIPTION OF DRAWINGS

FIG. 18 is a block diagram illustrating an example of a functional configuration of a camera head and a CCU.

MODE FOR CARRYING OUT THE INVENTION

Hereinafter, modes for carrying out the present technology will be described. Furthermore, the description will be given in the following order.

1. Configuration of Photometric Device
2. Operation of Photometric Device
3. Configuration of Capturing Device
4. Operation of Capturing Device
5. Another configuration and Operation of Capturing Device
6. Application Example
6-1. Application Example with respect to Mobile Object Control System 6-2. Application Example with respect to Endoscopic Surgery System

1. Configuration of Photometric Device

Figure 1:
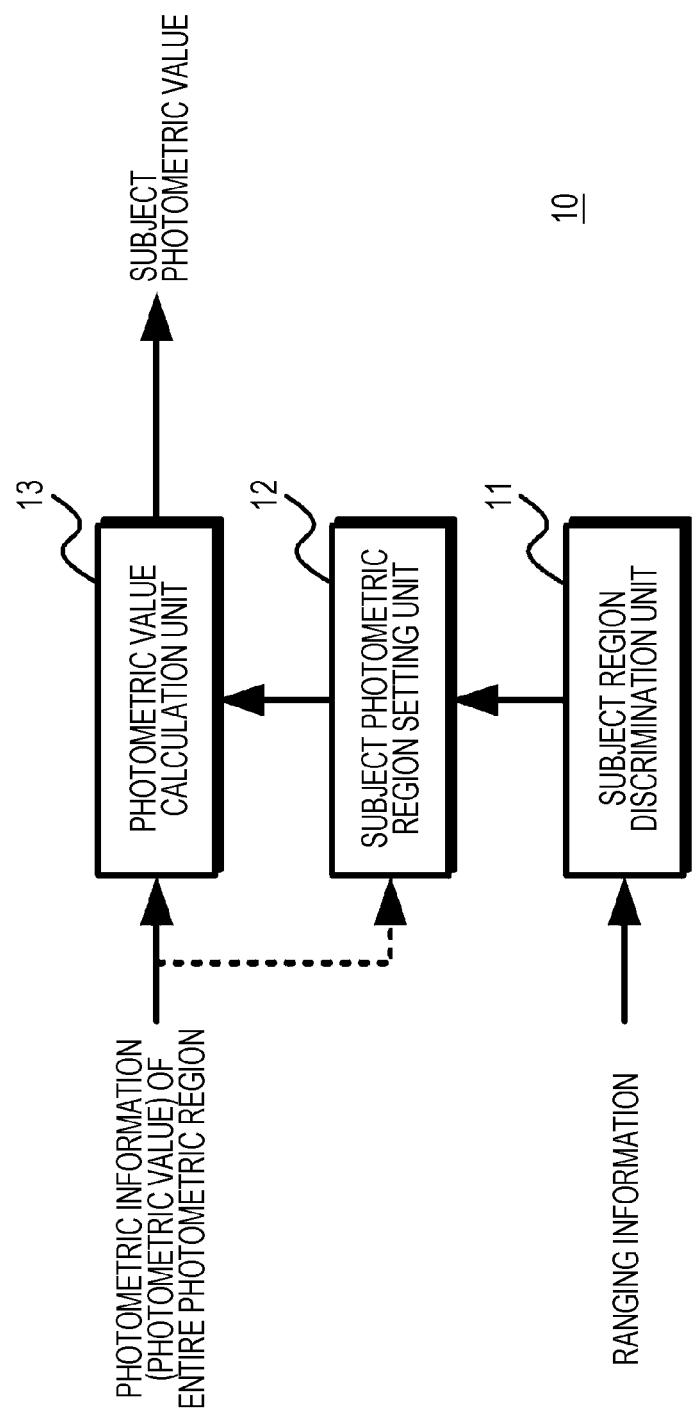
FIG. 1 is a diagram exemplifying the configuration of a photometric device.

FIG. 1 exemplifies a configuration of a photometric device of the present technology. A photometric device 10 includes a subject region discrimination unit 11, a subject photometric region setting unit 12, and a photometric value calculation unit 13.

The subject region discrimination unit 11 discriminates a desired subject region on the basis of ranging information for each ranging region. The subject region discrimination unit 11 discriminates a ranging region in which a ranging value is within a predetermined range with respect to a desired distance as the desired subject region, on the basis of the ranging information for each of the ranging regions obtained by performing the ranging with a ranging sensor, and outputs a discrimination result to the subject photometric region setting unit 12.

The subject photometric region setting unit 12 performs image signal processing by using a discrimination result of a subject region, covers the desired subject region, and sets a subject photometric region according to the subject region after the covering. The subject photometric region setting unit 12 divides the entire ranging region into a set of the desired subject region and the discriminated ranging regions and a set of the other ranging regions, according to the image signal processing, for example, clustering processing. In addition, the subject photometric region setting unit 12 may divide a plurality of photometric regions in which photometric information indicating an illuminance in a full-screen is obtained (for example, a plurality of regions in which a photometric value is detected from a through image) into a set of photometric regions corresponding to the desired subject region and the discriminated ranging region and a set of the other photometric regions, according to the clustering processing. The subject photometric region setting unit 12 sets a set of photometric regions corresponding to the set of the desired subject region and the discriminated ranging region, or a set of photometric regions corresponding to the desired subject region and the discriminated ranging region, to the subject photometric region that is a photometric region corresponding to a desired subject. That is, the subject photometric region setting unit 12 covers the desired subject region by the image signal processing, and sets a photometric region corresponding to the subject region after the covering to the subject photometric region. The subject photometric region setting unit 12 outputs a setting result of the subject photometric region to the photometric value calculation unit 13.

The photometric value calculation unit 13 to which the photometric information (a photometric value) of the entire photometric region is input calculates a photometric value of the desired subject region, for example, a subject photometric value of a subject in a focusing state by using the photometric information (a photometric value) of the subject photometric region set by the subject photometric region setting unit 12.

2. Operation of Photometric Device

Figure 2:
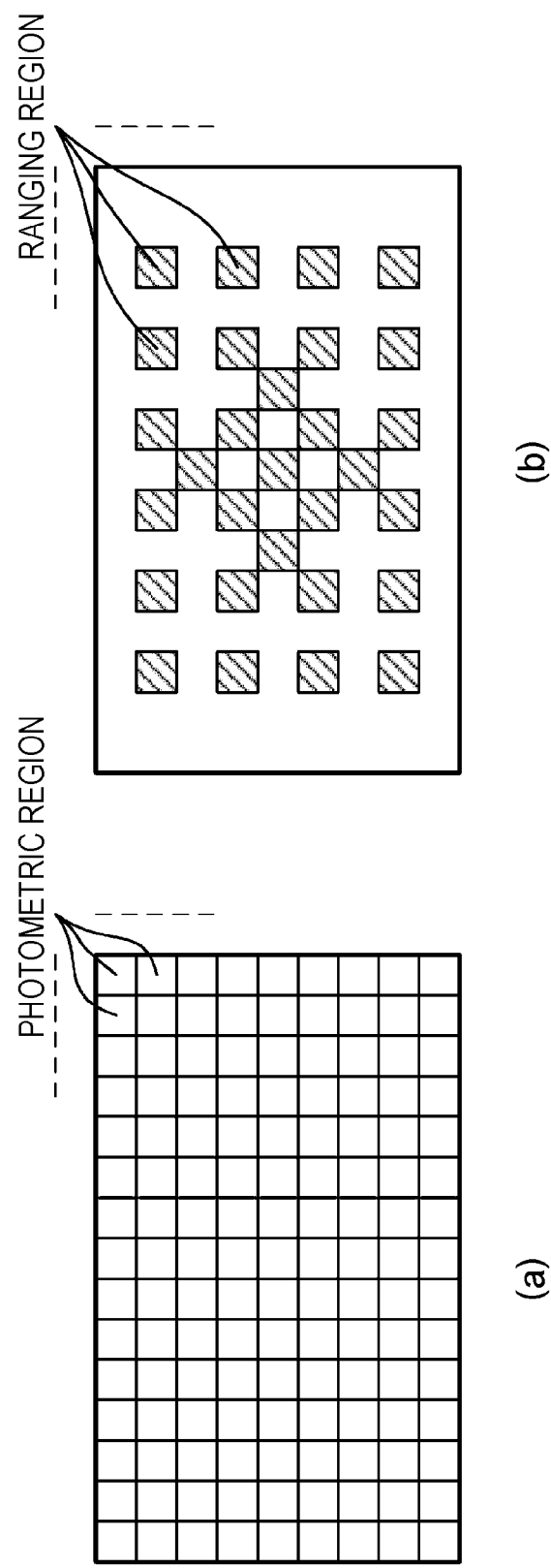
FIG. 2 is a diagram exemplifying a photometric region and a ranging region.

FIG. 2 exemplifies the photometric region and the ranging region. As illustrated in (a) of FIG. 2, in the photometric region, a full screen is divided into a plurality of regions, and the divided regions are individually set to the photometric region. As illustrated in (b) of FIG. 2, in the ranging region, a plurality of ranging regions illustrated by diagonal hatching is dispersedly provided. Furthermore, in order to simplify the description, the ranging region has the same size as that of the photometric region, and the position of the ranging region is coincident with that of any photometric region.

The subject region discrimination unit 11 discriminates the ranging region in which the ranging value is within the predetermined range with respect to the desired distance as the desired subject region, on the basis of the ranging information for each of the ranging regions generated by the ranging sensor.

Figure 3:
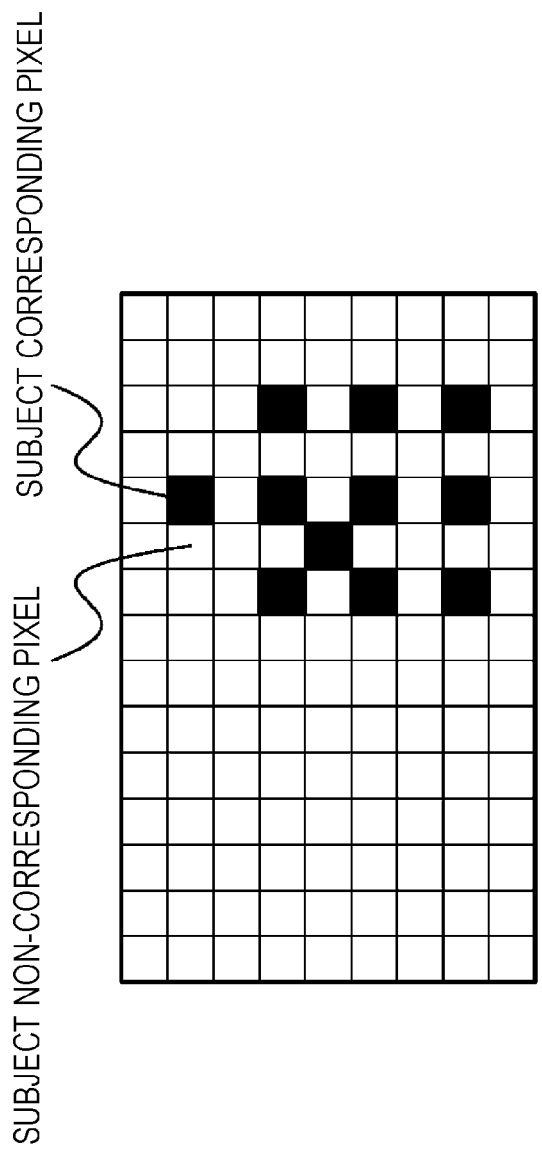
FIG. 3 is a diagram illustrating a region determination image.

The subject photometric region setting unit 12 performs the clustering processing by using the discrimination result of the subject region, and sets the subject photometric region. Furthermore, in order to easily understand the operation of the clustering processing, for example, as illustrated in FIG. 3, the operation of the clustering processing will be described by using a region determination image in which each photometric region is set to a pixel. In addition, in FIG. 3, it is illustrated that a black pixel is a pixel corresponding to a region that is discriminated as the subject region (hereinafter, referred to as a "subject region corresponding pixel").

Figure 4:
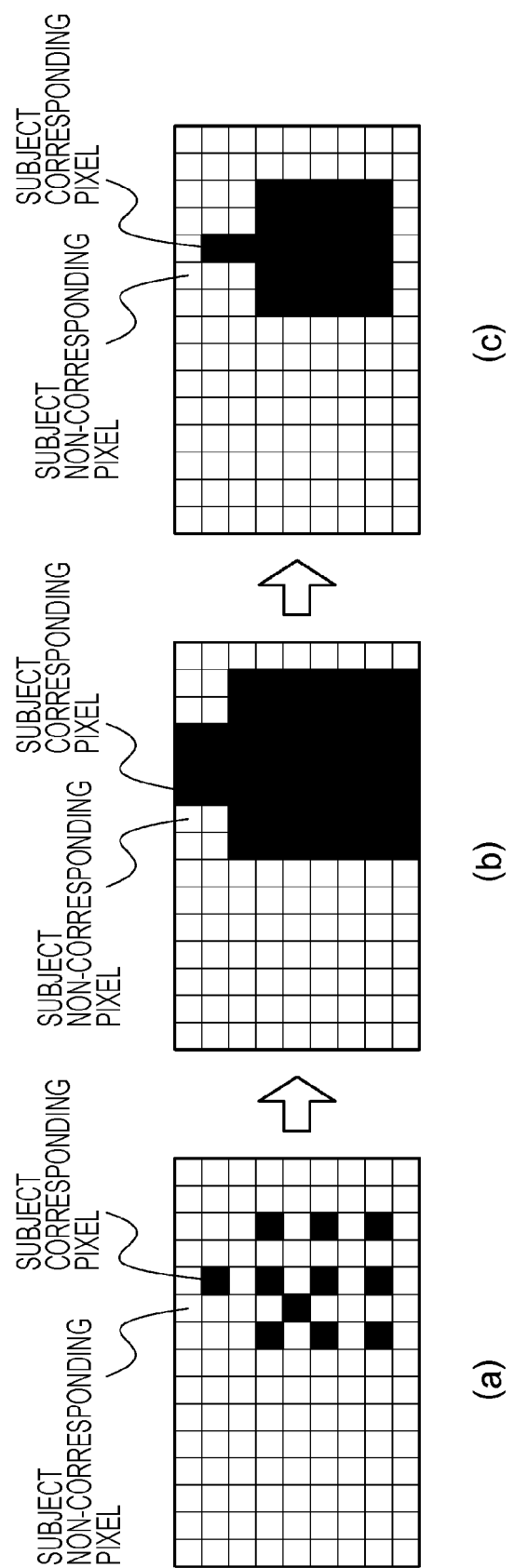
FIG. 4 is a diagram for illustrating clustering processing.

FIG. 4 is a diagram for illustrating the clustering processing. The subject photometric region setting unit 12 performs closing processing of the subject region as the clustering processing. Specifically, expansion processing and contraction processing are repeated the same number of times, reduction processing is performed after performing the expansion processing, and the pixel is divided into a set of pixels indicating the subject region and a set of the other pixels. (a) of FIG. 4 illustrates the region determination image before the clustering processing. (b) of FIG. 4 illustrates an image in which the expansion processing is performed with respect to the region determination image, and (c) of FIG. 4 illustrates an image in which the contraction processing is performed with respect to the region determination image after the expansion processing. The subject photometric region setting unit 12 performs the closing processing as described above, and thus, generates a region in which the subject region corresponding pixels are consecutive, and sets a photometric region corresponding to the region in which the subject region corresponding pixels are consecutive as the subject photometric region. That is, the subject photometric region setting unit 12 sets a photometric region corresponding to the subject region corresponding pixel as the subject photometric region in the region determination image illustrated in (c) of FIG. 4.

In addition, the subject photometric region setting unit 12 may set the subject photometric region according to image signal processing different from the closing processing. For example, a region having the number of regions of greater than or equal to a threshold value in which a peripheral region is the subject region in a non-subject region that is not the subject region, to the subject region, and sets a photometric region corresponding to the subject region after the replacement processing to the subject photometric region. Furthermore, in the region determination image, a pixel that is not the subject region corresponding pixel is set to a subject region non-corresponding pixel.

Figure 5:
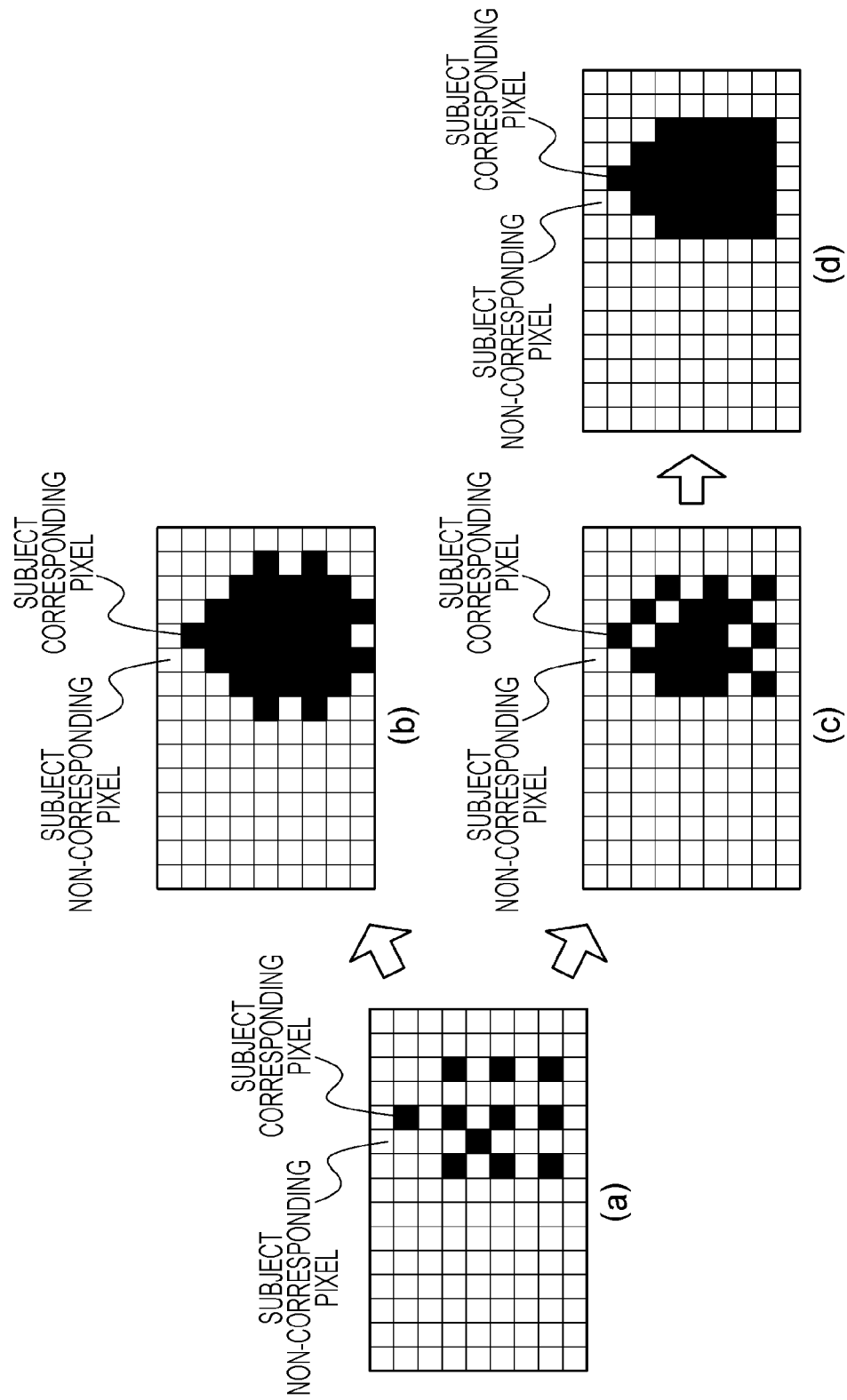
FIG. 5 is a diagram for illustrating replacement processing from a subject region non-corresponding pixel to a subject region corresponding pixel.

FIG. 5 is a diagram for illustrating the replacement processing from the subject region non-corresponding pixel to the subject region corresponding pixel. In a case where the number of subject region corresponding pixels positioned around the subject region non-corresponding pixel is set to "N", and "N" is greater than or equal to a threshold value Tha, the subject photometric region setting unit 12 replaces the subject region non-corresponding pixel with the subject region corresponding pixel. That is, the subject photometric region setting unit 12 replaces the subject region non-corresponding pixel with the subject region corresponding pixel, and sets the subject region corresponding pixels to be consecutive, according to the number of subject regions corresponding pixels provided around the subject region non-corresponding pixel.

(a) of FIG. 5 illustrates the region determination image before the clustering processing. (b) of FIG. 5 illustrates the region determination image after the clustering processing in which "Tha=2" is set. Such clustering processing is performed, and thus, a region can be generated in which the subject region corresponding pixels are consecutive. In addition, (c) of FIG. 5 illustrates the region determination image after the clustering processing in which "Tha=3" is set. In this case, the subject region non-corresponding pixel in which the subject region corresponding pixel is adjacent to four sides remains, and thus, the clustering processing is repeated in which "Tha=3" is set. As described above, the clustering processing is repeated, and thus, as illustrated in (d) of FIG. 5, it is possible to generate the region determination image including no subject region non-corresponding pixel in which the subject region corresponding pixel is adjacent to four sides. The subject photometric region setting unit 12 sets the photometric region corresponding to the region in which the subject region corresponding pixels are consecutive, that is, the photometric region corresponding to the subject region corresponding pixel in the region determination image illustrated in (b) of FIG. 5 of (d) of FIG. 5, as the subject photometric region.

Further, the subject photometric region setting unit 12 may perform the replacement processing of setting a non-subject region of less than or equal to a predetermined number of regions, the non-subject region being positioned between the subject regions in a predetermined direction and not being the subject region, to the subject region, and may set the photometric region corresponding to the subject region after the replacement processing as the subject photometric region.

Figure 6:
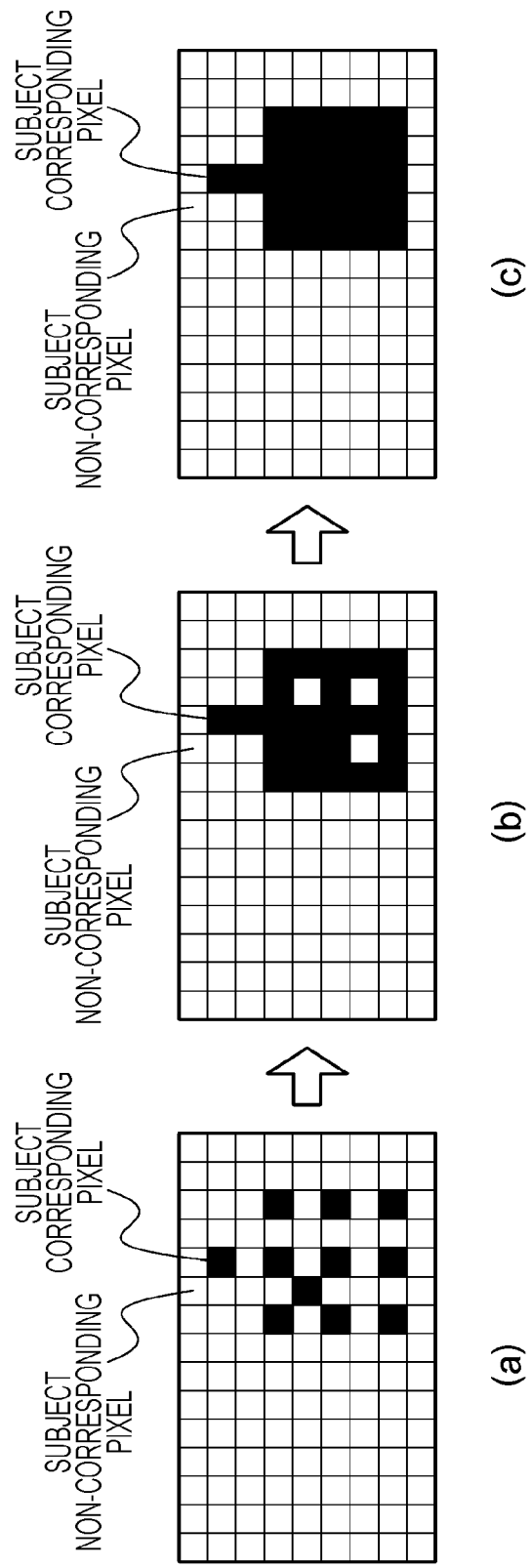
FIG. 6 is a diagram for illustrating another replacement processing from the subject region non-corresponding pixel to the subject region corresponding pixel.

FIG. 6 is a diagram for illustrating another replacement processing from the subject region non-corresponding pixel to the subject region corresponding pixel. For example, when the subject region non-corresponding pixel positioned between the subject region corresponding pixels in each of a horizontal direction and a vertical direction is less than or equal to a threshold value Thb, the subject photometric region setting unit 12 replaces the subject region non-corresponding pixel with the subject region corresponding pixel. That is, in a case where the subject region non-corresponding pixel positioned between the subject region corresponding pixels is less than or equal to the predetermined number, the subject photometric region setting unit 12 considers that the subject region non-corresponding pixel is included in the subject region, and replaces the subject region non-corresponding pixel with the subject region corresponding pixel. (a) of FIG. 6 illustrates the region determination image before the clustering processing. (b) of FIG. 6 illustrates a case where the subject region non-corresponding pixel interposed between the subject region corresponding pixels is switched to the subject region corresponding pixel, as "Thb=1". In addition, (c) of FIG. 6 illustrates a case where the subject region non-corresponding pixel interposed between the subject region corresponding pixels is switched to the subject region corresponding pixel with respect to the region determination image illustrated in (b) of FIG. 6, all of the subject region non-corresponding pixels interposed between the subject region corresponding pixels are switched to the subject region corresponding pixel. Such clustering processing is performed, and thus, it is possible to generate the region in which the subject region corresponding pixels are consecutive. The subject photometric region setting unit 12 sets the photometric region corresponding to the region in which the subject region corresponding pixels are consecutive, that is, a photometric region corresponding to the subject region corresponding pixel in the region determination image illustrated in (c) of FIG. 6, as the subject photometric region.

Furthermore, in the description of the clustering processing described above, the operation has been described by using the region determination image in order to easily understand the operation, but the subject photometric region setting unit 12 may set the subject photometric region by performing similar processing on the basis of a position relationship of the subject region without using the region determination image. In addition, as described above, the clustering processing may be performed on the basis of an image by setting each of the photometric regions as a pixel. In addition, opening processing may be performed without performing the closing processing at the time of setting the subject photometric region by covering the desired subject region. In the opening processing, the expansion processing is performed after performing the reduction processing, and thus, for example, in a case where the accuracy of the ranging information decreases or a lot of errors occur in a boundary portion between the subject region and the non-subject region, the expansion processing is performed after performing the reduction processing, and therefore, it is possible to set the subject photometric region by decreasing the influence of the error and the like in the boundary portion.

The photometric value calculation unit 13 calculates a subject photometric value of the desired subject by using a photometric value for each photometric region in the subject photometric region that is set by the subject photometric region setting unit 12. The subject photometric region setting unit 12, for example, sets the average value of the photometric values calculated for each of the photometric regions in the subject photometric region to the subject photometric value of the desired subject. In addition, the subject photometric region setting unit 12, for example, may perform weighting with respect to the photometric value of the photometric region according to a position in the subject photometric region, and may set the average value or an addition value of the photometric value after the weighting as the subject photometric value of the desired subject.

Figure 7:
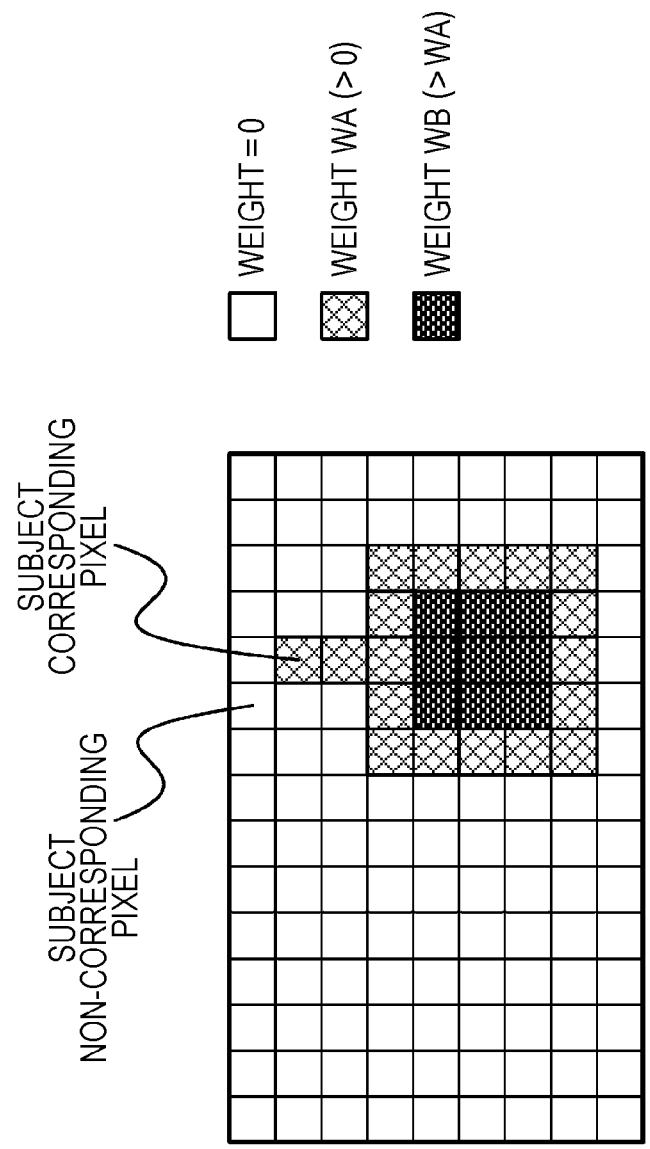
FIG. 7 is a diagram exemplifying weight with respect to the entire photometric region.

FIG. 7 exemplifies weight with respect to the entire photometric region. The photometric value calculation unit 13 sets the weight with respect to the photometric value of the photometric region according to the position in the subject photometric region, and sets the weight of a subject photometric region in which all peripheral regions are the subject photometric region to be higher than that of a subject photometric region in contact with the photometric region, the subject photometric region not being the subject photometric region. The photometric value calculation unit 13, for example, sets the weight with respect to the photometric region that is not the subject photometric region to "0", and the weight with respect to the subject photometric region in contact with the photometric region, the subject photometric region not being the subject photometric region, to "WA (>0)". In addition, the photometric value calculation unit 13 sets the weight with respect to the subject photometric region in which all of the peripheral regions are the subject photometric region to "WB (>WA)". The photometric value calculation unit 13, for example, multiplies the photometric value and the weight together for each of the photometric regions, and divides an addition value of a multiplying result by the total value of the weight to be the subject photometric value of the desired subject.

In addition, the weighting with respect to the photometric region is not limited to the case of being performed according to the position in the subject photometric region, and may be performed according to a designation operation of a focus position. For example, in a case where the ranging region is designated, and a subject in the designated ranging region is focused, the weighting of setting the weight of a photometric value of a predetermined region range based on a photometric region corresponding to a ranging region in the focusing state (hereinafter, a "designation ranging region") to be high may be performed.

Figure 8:
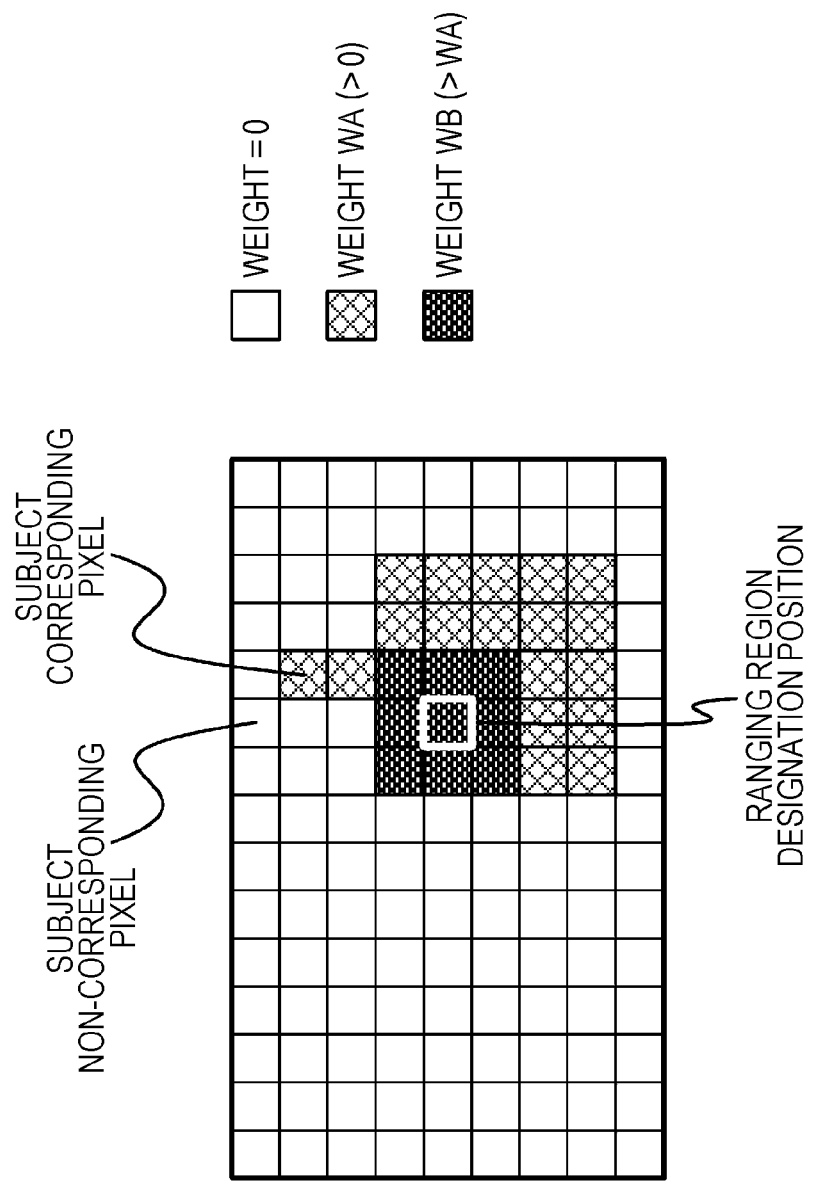
FIG. 8 is a diagram exemplifying weight in a case where the ranging region is designated.

FIG. 8 exemplifies the weight in a case where the ranging region is designated. The photometric value calculation unit 13 sets the weight of the photometric value of the predetermined region range based on the photometric region corresponding to the designation ranging region, the photometric region being the subject photometric region, to be higher than that of the photometric value of the other photometric regions. The photometric value calculation unit 13, for example, sets the weight with respect to the photometric region that is not the subject photometric region to "0". In addition, the weight with respect to the subject photometric region is set to "WA (>0)". Further, the photometric value calculation unit 13, for example, sets weight WB of the photometric region in which the photometric region corresponding to the designation ranging region is in contact with a side or a corner to "WB (>WA)". As described above, in the case of performing the weighting on the basis of the photometric region corresponding to the designation ranging region, it is possible to accurately calculate a photometric value with respect to the subject that is focused according to the designation of the ranging region.

Further, the weighting with respect to the photometric region is not limited to the case of being performed according to the position in the subject photometric region or the designation operation of the focus position, and the weighting of setting the weight of a characteristic portion of the desired subject to be high on the basis of a subject recognition result of a captured image including the desired subject may be performed. For example, in the case of performing the weighting of setting the weight of the photometric value to be high with respect to a ranging region corresponding to the position of a face region of a figure that is detected by subject recognition of the captured image, it is possible to accurately calculate a photometric value with respect to the face of the figure.

Furthermore, it is sufficient that a ranging device is capable of setting the subject photometric region according to the clustering processing using the ranging information, and as illustrated in FIG. 2, the present technology is not limited to a case where the number of ranging regions is less than the number of photometric regions. For example, the number of photometric regions may be identical to the number of ranging regions, or the number of ranging regions may be greater than the number of photometric regions. In addition, the present technology is not limited to a case where the size of the photometric region is identical to the size of the ranging region, and the size of the photometric region may be different from the size of the ranging region.

Figure 9:
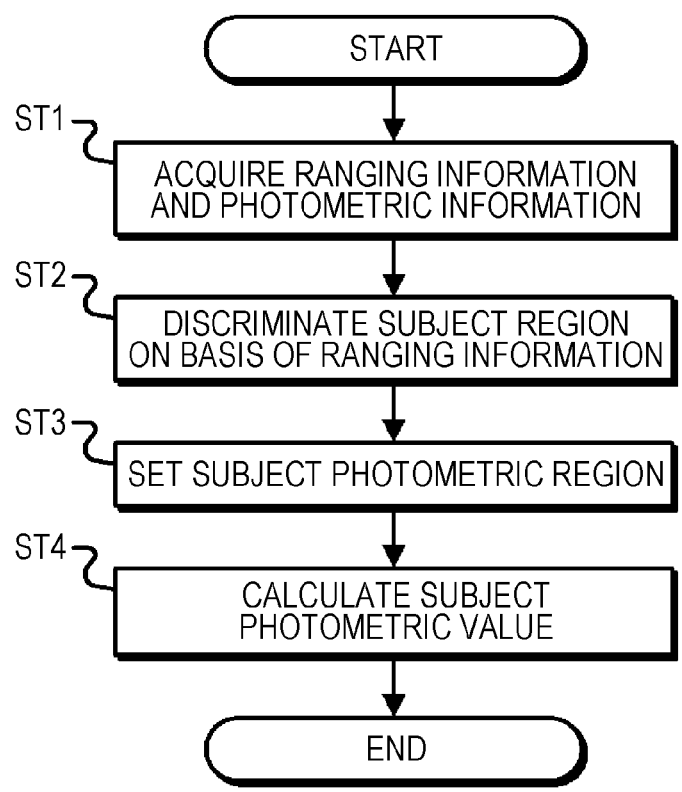
FIG. 9 is a flowchart illustrating an operation of the photometric device.

FIG. 9 is a flowchart illustrating the operation of the photometric device. In Step ST1, the photometric device acquires the ranging information and the photometric information. The photometric device 10 acquires the ranging information from a ranging sensor and the photometric information from a photometric sensor, and the process proceeds to Step ST2.

In Step ST2, the photometric device discriminates the subject region on the basis of the ranging information. The photometric device 10 discriminates the ranging region in which the ranging value is within the predetermined range with respect to the desired distance as the desired subject region, and the process proceeds to Step ST3.

In Step ST3, the photometric device sets the subject photometric region. The photometric device 10 performs the clustering processing by using the discrimination result of the subject region, and sets the subject photometric region that is the photometric region corresponding to the desired subject, and the process proceeds to Step ST4.

In Step ST4, the photometric device calculates the subject photometric value. The photometric device 10 calculates the subject photometric value of the desired subject by using the photometric value of the subject photometric region.

Figure 10:
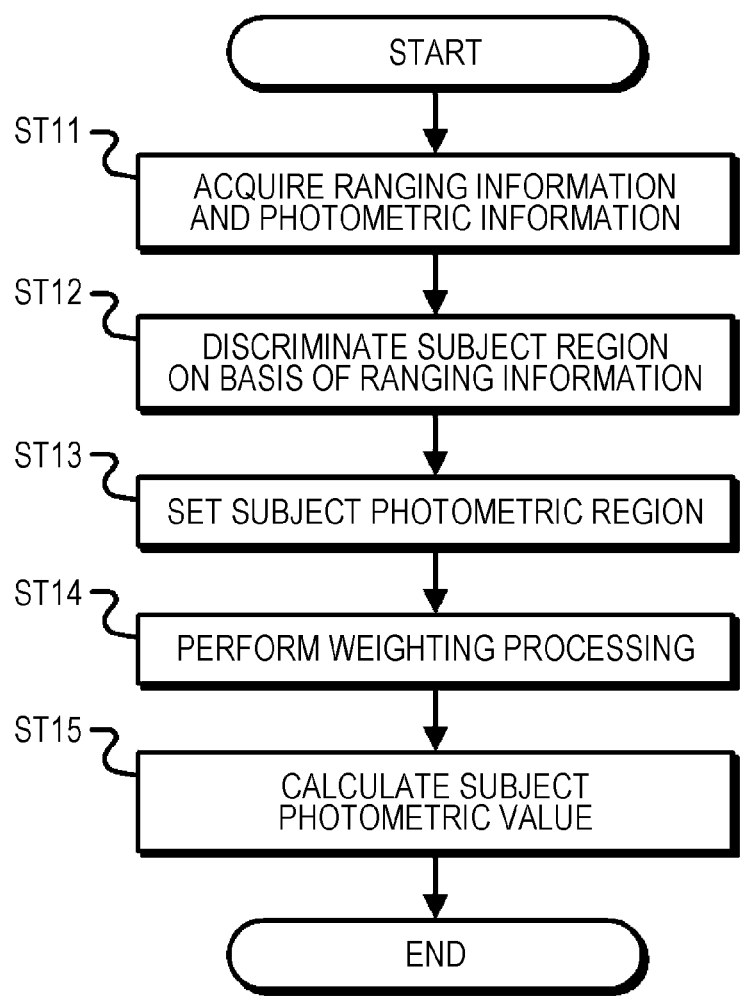
FIG. 10 is a flowchart illustrating another operation of the photometric device.

FIG. 10 is a flowchart illustrating another operation of the photometric device, and illustrates a case where the weighting is performed with respect to the photometric value of the photometric region.

In Step ST11, the photometric device acquires the ranging information and the photometric information. The photometric device 10 acquires the ranging information from the ranging sensor and the photometric information from the photometric sensor, and the process proceeds to Step ST12.

In Step ST12, the photometric device discriminates the subject region on the basis of the ranging information. The photometric device 10 discriminates the ranging region in which the ranging value is within the predetermined range with respect to the desired distance as the desired subject region, and the process proceeds to Step ST13.

In Step ST13, the photometric device sets the subject photometric region. The photometric device 10 performs the clustering processing by using the discrimination result of the subject region, and sets the subject photometric region that is the photometric region corresponding to the desired subject, and the process proceeds to Step ST14.

In Step ST14, the photometric device performs weighting processing. The photometric device 10 performs the weighting with respect to the photometric region on the basis of the position in the subject photometric region, the focus position, the position of the characteristic portion of the desired subject, and the like, and the process proceeds to Step ST15.

In Step ST15, the photometric device calculates the subject photometric value. The photometric device 10 calculates the subject photometric value of the desired subject by using the photometric value of the subject photometric region and the weight that is set.

As described above, in the photometric device of the present technology, the subject photometric region that is the photometric region corresponding to the desired subject is set, and the subject photometric value of the desired subject is calculated from the photometric value of the subject photometric region, according to the clustering processing of the subject region that is discriminated on the basis of the ranging information. Therefore, even in a case where the desired subject is a subject having a small contrast or a subject from which it is difficult to obtain the ranging information, it is possible to calculate the photometric value of the desired subject region. For this reason, a photometric value in a boundary region between the subject and the background is not calculated as the photometric value of the desired subject region, and it is possible to correctly adjust exposure with respect to the desired subject region.

3. Configuration of Capturing Device

Figure 11:
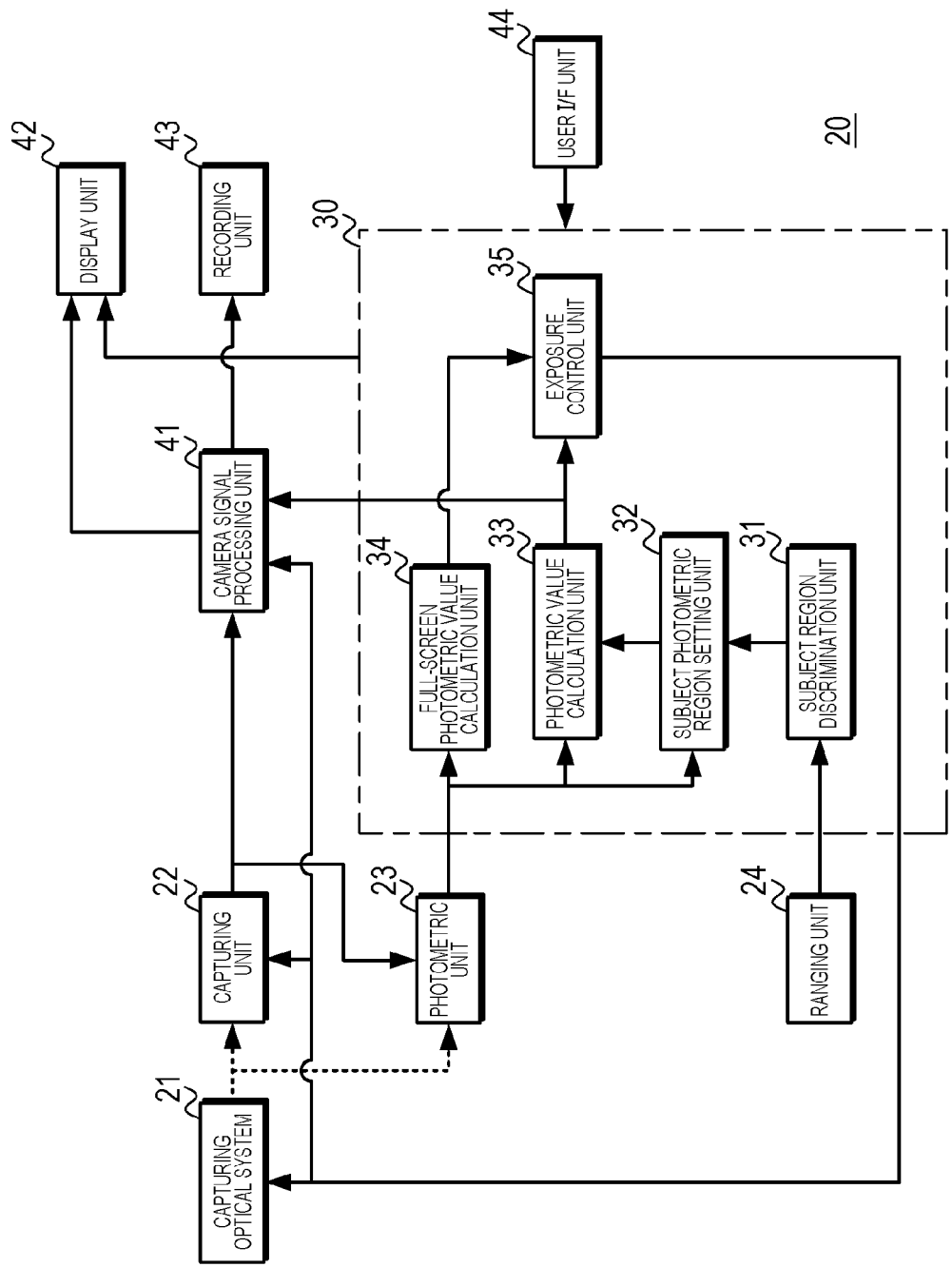
FIG. 11 is a diagram exemplifying a configuration of a capturing device.

Next, a capturing device using the photometric device of present technology will be described. FIG. 11 exemplifies the configuration of the capturing device. A capturing device 20 includes a capturing optical system 21, a capturing unit 22, a photometric unit 23, a ranging unit 24, a control unit 30, a camera signal processing unit 41, a display unit 42, a recording unit 43, and a user interface (I/F) unit 44.

The capturing optical system 21 is configured by using a focus lens, a zoom lens, or the like. The capturing optical system 21 drives the focus lens, the zoom lens, or the like on the basis of a control signal from the control unit 30, and forms a subject optical image on a capturing surface of the capturing unit 22 with a desired size. In addition, the capturing optical system 21 inputs light flux through the focus lens, the zoom lens, or the like into the photometric unit 23. Further, an iris (diaphragm) mechanism and the like may be provided in the capturing optical system 21, and the iris mechanism and the like may be driven on the basis of the control signal from the control unit 30.

The capturing unit 22 is configured by using a capturing element such as a complementary metal oxide semiconductor (CMOS) of a charge coupled device (CCD). The capturing unit 22 performs photoelectric conversion, generates an image signal according to the subject optical image, and output the image signal to the camera signal processing unit 41. In addition, in the case of a configuration in which photometry is performed on the basis of the image signal, the capturing unit 22 outputs the generated image signal to the photometric unit 23. Further, the capturing unit 22 sets an exposure time on the basis of the control signal from the control unit 30.

The photometric unit 23 detects the illuminance of the subject. The photometric unit 23 partitions the full screen into a plurality of photometric regions, detects an illuminance for each of the photometric regions, and generates the photometric information. For example, in a photometric element used in the photometric unit 23, the plurality of photometric regions is set within a capturing range of the capturing unit 22, and the photometric unit 23 independently detects the illuminance of the subject in each of the photometric regions, and generates the photometric information (the photometric value) indicating a detection result. In addition, in a case where the photometric unit 23 performs the photometry by using the image signal generated by the capturing unit 22, the photometric unit 23 sets the plurality of photometric regions within the capturing range of the capturing unit 22, detects the illuminance of the subject for each of the ranging regions on the basis of the image signal of each of the photometric regions, and generates the photometric information indicating the detection result. The photometric unit 23 outputs the generated photometric information to the control unit 30.

The ranging unit 24 detects a distance to the subject. The ranging unit 24 detects the distance to the subject in the ranging region by providing the plurality of ranging regions in the full screen, and generates the ranging information indicating a distance detection result. For example, in the capturing unit 22, in the case of using a field phase difference automatic focus (AF) type capturing element in which a pixel for capturing and a pixel for focal point detection are provided, the distance is detected on the basis of a phase difference generated between the pixels for focal point detection, and the ranging information is generated. Furthermore, the ranging unit 24 may detect the distance to the subject by using a stereo camera, time of flight (TOF) camera, and the like, and may generate the ranging information. The ranging unit 24 outputs the generated ranging information to the control unit 30.

The control unit 30 includes a subject region discrimination unit 31, a subject photometric region setting unit 32, a photometric value calculation unit 33, a full-screen photometric value calculation unit 34, and an exposure control unit 35.

The subject region discrimination unit 31 discriminates the desired subject region on the basis of the ranging information for each of the ranging regions generated by the ranging unit 24. The subject region discrimination unit 31 discriminates the ranging region in the focusing state in which the ranging value is within the predetermined range with respect to the desired distance as the desired subject region, on the basis of the ranging information for each of the ranging regions, and outputs the discrimination result to the subject photometric region setting unit 32.

The subject photometric region setting unit 32 performs the clustering processing by using the discrimination result of the subject region, and sets the subject photometric region. The subject photometric region setting unit 32, for example, divides the entire photometric region in which the photometric information is obtained into the set of the photometric regions corresponding to the desired subject region and the discriminated ranging region and the set of the other photometric regions, according to the clustering processing. In addition, the subject photometric region setting unit 32 sets the set of the photometric regions corresponding to the desired subject to the subject photometric region, and outputs the setting result of the subject photometric region to the photometric value calculation unit 33.

The photometric value calculation unit 33 calculates the subject photometric value of the desired subject by using the photometric value of the subject photometric region, on the basis of the photometric information generated by the photometric unit 23, and the setting of the subject photometric region in the subject photometric region setting unit 32. In addition, the photometric value calculation unit 33 may perform the weighting with respect to the photometric value of the subject photometric region according to the position in the subject photometric region on the basis of the photometric information generated by the photometric unit 23 and the setting result of the subject photometric region in the subject photometric region setting unit 32, and may calculate the subject photometric value by using the photometric value after the weighting. Further, in a case where the ranging region in the focusing state is designated, the photometric value calculation unit 33 may perform the weighting of setting the weight of the photometric value of the predetermined region range based on the photometric region corresponding to the designated ranging region to be high, and may calculate the subject photometric value by using the photometric value after the weighting. The photometric value calculation unit 33 outputs the calculated subject photometric value to the exposure control unit 35 and the camera signal processing unit 41.

The full-screen photometric value calculation unit 34 calculates a photometric value with respect to the entire capturing range of the capturing unit 22 (hereinafter, referred to as a "full-screen photometric value") by using the photometric value of each of the photometric regions, on the basis of the photometric information generated by the photometric unit 23, and outputs the calculated photometric value to the exposure control unit 35.

The exposure control unit 35 generates the control signal such that the captured image of optimal exposure can be generated, on the basis of the subject photometric value calculated by the photometric value calculation unit 33, and the full-screen photometric value calculated by the full-screen photometric value calculation unit 34, and outputs the control signal to the capturing optical system 21, the capturing unit 22, the camera signal processing unit 41, and the like. In addition, the exposure control unit 35 generates the control signal according to a photometric mode and the like, on the basis of an operation signal from the user interface unit 44.

The camera signal processing unit 41 performs noise removal processing, gain adjustment processing, analog/digital conversion processing, defective pixel correction, and the like with respect to the image signal generated by the capturing unit 22. In addition, in a case where a color mosaic filter is used in the capturing unit 22, demosaic processing is performed, and image signals indicating each color component, for example, image signals of three primary colors are generated from an image signal in which one pixel represents one color component. In addition, the camera signal processing unit 41 performs aberration correction or color correction, color space conversion of converting the image signal into an image signal of a predetermined color space, for example, signals of three primary colors into an illuminance signal and a color difference signal, and the like. Further, the camera signal processing unit 41 performs resolution conversion of converting the image signal into an image signal of a display resolution corresponding to the display unit 42 or a resolution that is recorded in the recording unit 43, and the like, and outputs the image signal after camera signal processing to the display unit 42 or the recording unit 43. In addition, the camera signal processing unit 41 may perform encoding processing of the image signal that is recorded in the recording unit 43 or decoding processing of the encoded signal that is recorded in the recording unit 43. In addition, the camera signal processing unit 41 may perform the camera signal processing by using the subject photometric value. For example, the camera signal processing unit 41 performs processing of increasing an information amount such that the image indicating the desired subject becomes an image indicating a more excellent grayscale, and the like.

The display unit 42 is configured by using a liquid crystal display element, an organic EL display element, and the like. The display unit 42 displays the captured image that is acquired by the capturing unit 22 or the captured image that is recorded in the recording unit 43. In addition, even though it is not illustrated, a display signal for displaying various setting screens such as the function or the operation of the capturing device 20, various information items, and the like is generated by the control unit 30, and is output to the display unit 42.

A recording medium is fixedly or detachably provided in the recording unit 43. The recording unit 43 records the image signal or coded data output from the camera signal processing unit 41 in the recording medium.

The user I/F unit 44 includes an operation switch, an operation button, an operation dial, a touch panel, and the like, generates the operation signal according to an user operation, and outputs the operation signal to the control unit 30.

4. Operation of Capturing Device

Figure 12:
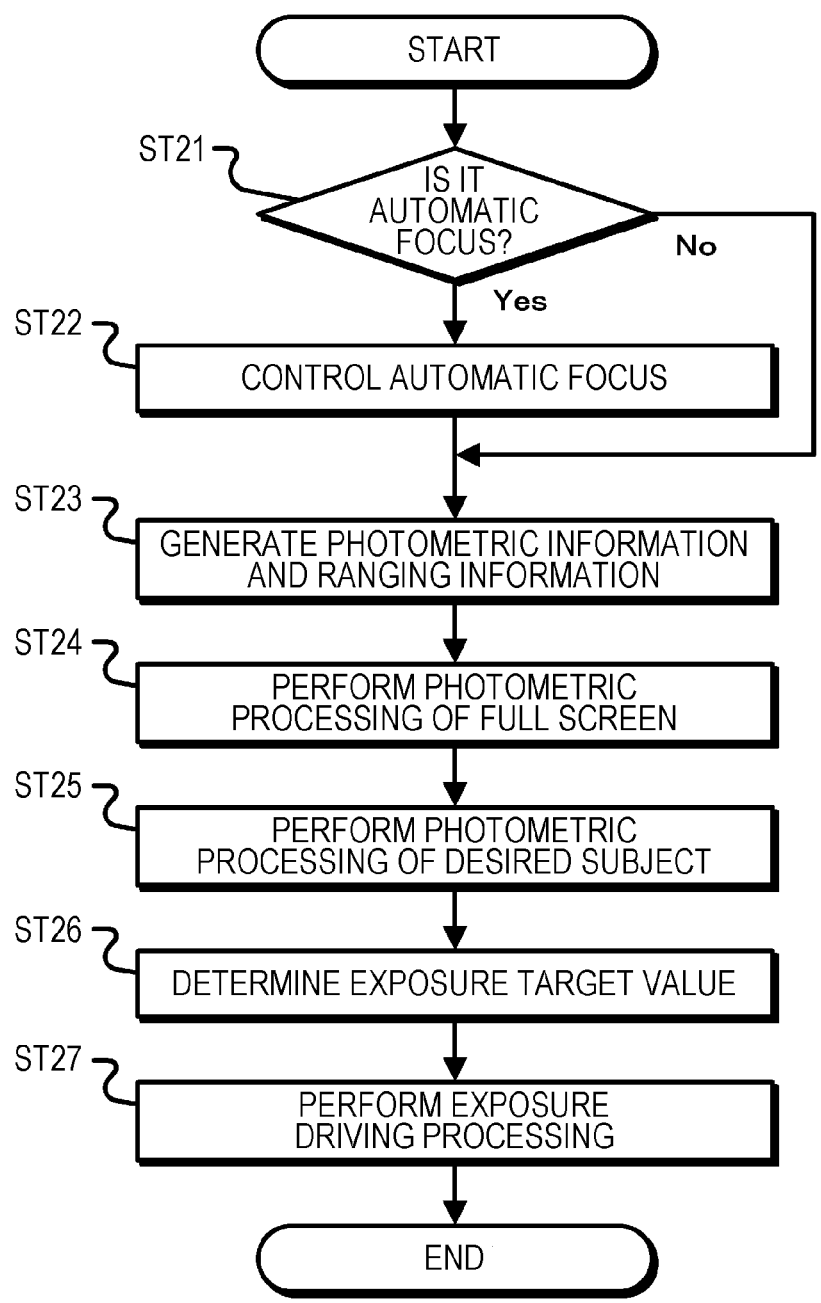
FIG. 12 is a flowchart illustrating an operation of the capturing device.

Next, the operation of the capturing device will be described. FIG. 12 is a flowchart illustrating the operation of the capturing device. In Step ST21, the capturing device discriminates whether or not it is automatic focus, and in a case where an automatic focus operation is selected by a user, the process proceeds to Step ST22, and in a case where a manual focus operation is selected, the process proceeds to Step ST23.

In Step ST22, the capturing device performs automatic focus control. The control unit 30 of the capturing device 20 performs driving control with respect to the focus lens of the capturing optical system 21 such that a subject in a predetermined ranging region or in a ranging region selected by the user is focused, on the basis of the ranging information generated by the ranging unit 24, and the process proceeds to Step ST23.

In Step ST23, the capturing device generates the photometric information and the ranging information. The photometric unit 23 of the capturing device 20 generates the photometric information, and outputs the photometric information to the control unit 30, the ranging unit 24 generates the ranging information, and outputs the ranging information to the control unit 30, and the process proceeds to Step ST24.

In Step ST24, the capturing device performs photometric processing of the entire screen. The full-screen photometric value calculation unit 34 of the control unit 30 calculates the full-screen photometric value that is the photometric value with respect to the entire capturing range by using the photometric value for each of the photometric regions.

In Step ST25, the capturing device performs the photometric processing of the desired subject. The subject region discrimination unit 31 of the control unit 30 discriminates the ranging region indicating the desired distance as the subject region, on the basis of the ranging information. In addition, the subject photometric region setting unit 32 performs the clustering processing by using the discrimination result of the subject region, and sets the subject photometric region that is the photometric region corresponding to the desired subject. Further, the photometric value calculation unit 33 calculates subject photometric value of the desired subject by using the photometric value of the subject photometric region or the photometric value after the weighting.

In Step ST26, the capturing device determines an exposure target value. The exposure control unit 35 of the control unit 30 determines the exposure target value on the basis of the full-screen photometric value calculated in Step ST24 and the subject photometric value calculated in Step ST25, and the process proceeds to Step ST27. Furthermore, in the operation of the capturing device, the order of Step ST24 and Step ST25 may be reversed.

The exposure control unit 35 is capable of adjusting an exposure result to be obtained according to the degree of priority with respect to each of the full-screen photometric value and the subject photometric value. In a case where exposure control prioritizing the subject photometric value is performed, the exposure control unit 35 is capable of performing automatic exposure that is rarely drawn by a change in the background. In addition, the exposure control unit 35 may discriminate a capturing state on the basis of the full-screen photometric value and the subject photometric value, and for example, when the full-screen photometric value is in a backlight state greater than that of the subject photometric value, the exposure control unit 35 may determine the exposure target value such that the desired subject does not become excessively dark, on the basis of the full-screen photometric value and the subject photometric value. In addition, the exposure control unit 35 determines the exposure target value according to the photometric mode that is selected by the user. For example, in the case of the photometric mode in which the exposure control is performed on the basis of the photometric value of each of the photometric regions, the exposure target value is determined on the basis of the full-screen photometric value. In addition, in the case of the photometric mode in which the exposure control is performed with the emphasis on the desired subject, the exposure target value is determined on the basis of the subject photometric value. Further, the exposure control unit 35 may determine the exposure target value on the basis of the full-screen photometric value or the subject photometric value, according to the capturing mode that is selected by the user or a capturing scene that is automatically discriminated. For example, in the case of the capturing mode or the capturing scene in which illumination light is emitted at the time of performing capturing, the desired subject is greatly irradiated with the illumination light. For this reason, the exposure control unit 35 may obtain a captured image in which both of the desired subject and the background respectively have a suitable brightness by decreasing the priority of the subject photometric value.

In Step ST27, the control device performs exposure driving processing. The exposure control unit 35 of the control unit 30 generates the control signal such that the exposure target value determined in Step ST25 is obtained, and performs adjustment of the diaphragm mechanism of the capturing optical system 21, the exposure time of the capturing unit 22, and an ISO sensitivity with respect to the camera signal processing unit 41, and the like.

As described above, in the capturing device of the present technology, the subject photometric region that is the photometric region according to the desired subject is set according to the clustering processing of the subject region that is discriminated on the basis of the ranging information generated by the ranging unit. In addition, in the capturing device, the subject photometric value of the desired subject is calculated on the basis of the photometric value of the subject photometric region in the photometric value for each of the photometric regions generated by the photometric unit. Therefore, it is possible to accurately perform the exposure control according to the photometric mode, the capturing mode, the capturing scene, and the like, on the basis of the subject photometric value of the desired subject, or the full-screen photometric value. For example, even in a situation where the desired subject becomes dark due to backlight and the like, and thus, only an outer circumference portion of the desired subject is focused, the automatic exposure control is performed such that the subject region is correctly extracted, and thus, a captured image can be obtained in which the desired subject has a suitable brightness.

5. Another Configuration and Operation of Capturing Device

Figure 13:
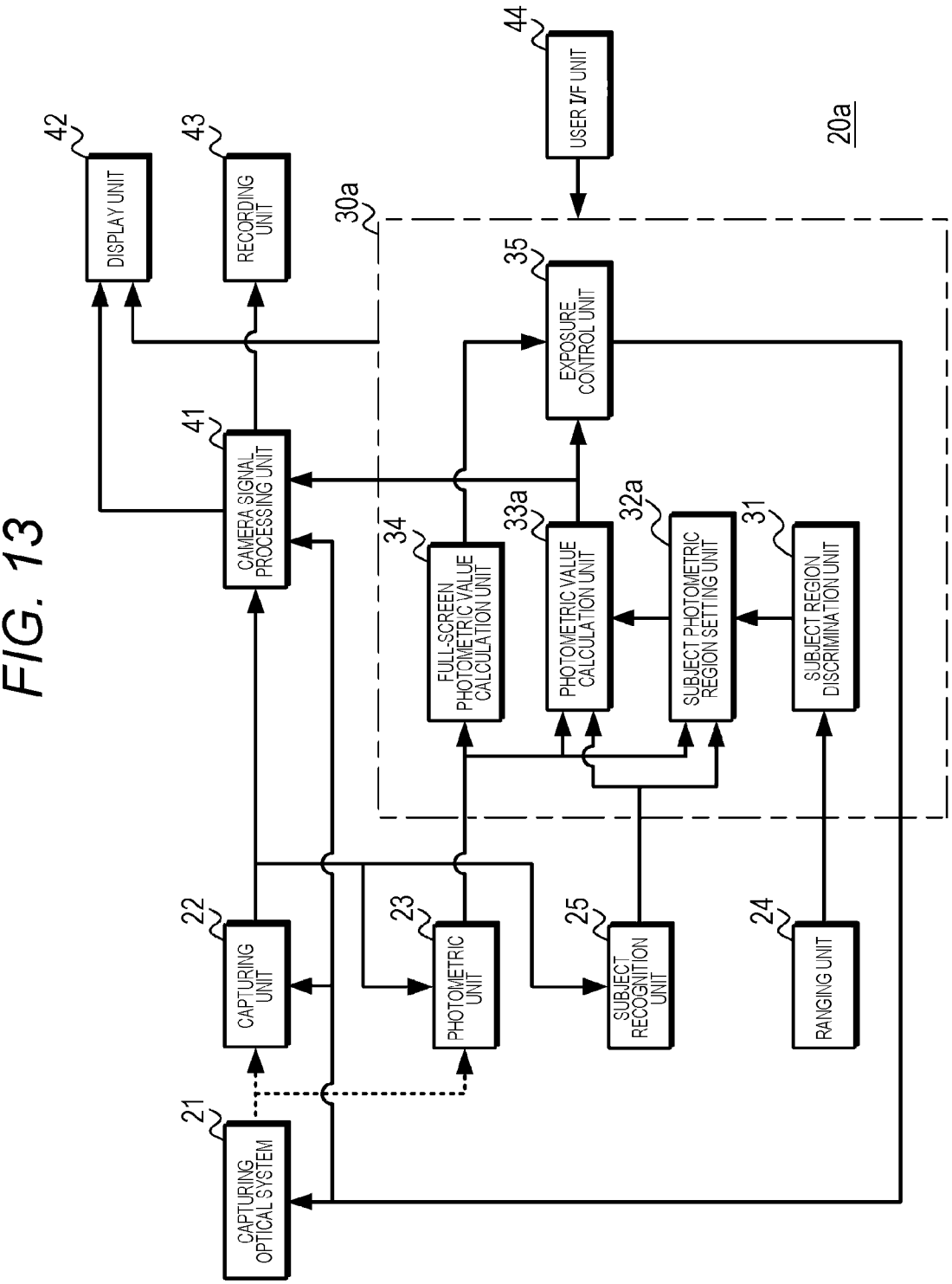
FIG. 13 is a diagram exemplifying another configuration of the capturing device.

Next, another configuration and another operation of the capturing device will be described. FIG. 13 exemplifies another configuration of the capturing device. A capturing device 20a includes the capturing optical system 21, the capturing unit 22, the photometric unit 23, the ranging unit 24, a control unit 30a, the camera signal processing unit 41, the display unit 42, the recording unit 43, and the user interface (I/F) unit 44. Further, the capturing device 20a includes a subject recognition unit 25. Furthermore, the capturing optical system 21, the capturing unit 22, the photometric unit 23, the ranging unit 24, the camera signal processing unit 41, the display unit 42, the recording unit 43, and the user interface (I/F) unit 44 have a configuration similar to that of the capturing device 20 illustrated in FIG. 11.

The capturing optical system 21 drives the focus lens, the zoom lens, and the like on the basis of the control signal from the control unit 30, and forms the subject optical image on the capturing surface of the capturing unit 22 with a desired size. In addition, the capturing optical system 21 inputs the light flux through the focus lens, the zoom lens, or the like into the photometric unit 23. Further, in the capturing optical system 21, the iris mechanism and the like are driven on the basis of the control signal from the control unit 30.

The capturing unit 22 generates the image signal according to the subject optical image, and outputs the image signal to the camera signal processing unit 41. In addition, in a case where the photometry is performed on the basis of the image signal, the capturing unit 22 outputs the generated image signal to the photometric unit 23. Further, the capturing unit 22 may set the exposure time on the basis of the control signal from the control unit 30.

The photometric unit 23 detects the illuminance for each of the photometric regions, generates the photometric information, and outputs the photometric information to the control unit 30a. The ranging unit 24 detects the distance to the subject in the ranging region for each of the ranging regions, generates the ranging information, and outputs the ranging information to the control unit 30.

The subject recognition unit 25 performs the subject recognition by using the image signal that is generated by the capturing unit 22 or the image signal that is generated by performing the camera signal processing in the camera signal processing unit 41, and detects the characteristic portion of the desired subject, for example, a face portion of a human body, and the like. In addition, the subject recognition unit 25 may perform region division for each of the subjects recognized by performing the subject recognition. The subject recognition unit 25 outputs the subject recognition result indicating a detection result of the characteristic portion of the desired subject or a region division result to the control unit 30a.

The control unit 30a includes the subject region discrimination unit 31, a subject photometric region setting unit 32a, a photometric value calculation unit 33a, the full-screen photometric value calculation unit 34, and the exposure control unit 35.

The subject region discrimination unit 31 discriminates the desired subject region on the basis of the ranging information for each of the ranging regions generated by the ranging unit 24, and outputs the discrimination result to the subject photometric region setting unit 32a. Furthermore, the subject region discrimination unit 31 may discriminate the subject region on the basis of the ranging information and the subject recognition result.

The subject photometric region setting unit 32a performs the clustering processing by using the discrimination result of the subject region, and sets the subject photometric region. In addition, the subject photometric region setting unit 32a may set the subject photometric region by using the subject recognition result of the subject recognition unit 25. For example, in a divided region indicated by the subject recognition result, a photometric region corresponding to the divided region including the subject region after the clustering processing is set to the subject photometric region. The subject photometric region setting unit 32*a* outputs the setting result of the subject photometric region to the photometric value calculation unit 33*a*.

The photometric value calculation unit 33*a* calculates the subject photometric value on the basis of the photometric information generated by the photometric unit 23, and the setting result of the subject photometric region in the subject photometric region setting unit 32*a*. In addition, the photometric value calculation unit 33*a* may perform the weighting according to the position in the subject photometric region, or the designation of the ranging region in the focusing state, with respect to the photometric value of the subject photometric region. In addition, the photometric value calculation unit 33*a* may perform the weighting of setting the weight of the characteristic portion of the desired subject to be high on the basis of the subject recognition result of the subject recognition unit 25. The photometric value calculation unit 33*a* performs at least any weighting, and calculates the subject photometric value by using the photometric value after the weighting. The photometric value calculation unit 33*a* outputs the calculated subject photometric value to the exposure control unit 35 and the camera signal processing unit 41.

The full-screen photometric value calculation unit 34 calculates the full-screen photometric value by using the photometric value of each of the photometric regions, on the basis of the photometric information that is generated by the photometric unit 23, and outputs the full-screen photometric value to the exposure control unit 35.

The exposure control unit 35 generates the control signal such that the captured image of optimal exposure can be generated, on the basis of the subject photometric value calculated by the photometric value calculation unit 33*a*, and the full-screen photometric value calculated by the full-screen photometric value calculation unit 34, and outputs the control signal to the capturing optical system 21, the capturing unit 22, the camera signal processing unit 41, and the like. In addition, the exposure control unit 35 generates the control signal according to the photometric mode and the like, on the basis of the operation signal from the user interface unit 44.

The camera signal processing unit 41 performs various processings as described above with respect to the image signal that is generated by the capturing unit 22, and outputs the image signal after the camera signal processing to the display unit 42 or the recording unit 43. The display unit 42 displays the captured image that is acquired by the capturing unit 22, or the captured image that is recorded in the recording unit 43. In addition, various setting screens such as the function or the operation of the capturing device 20, various information items, and the like are displayed. The recording unit 43 records the image signal and the like output from the camera signal processing unit 41 in the recording medium. The user I/F unit 44 generates the operation signal according to the user operation, and outputs the operation signal to the control unit 30*a*.

Figure 14:
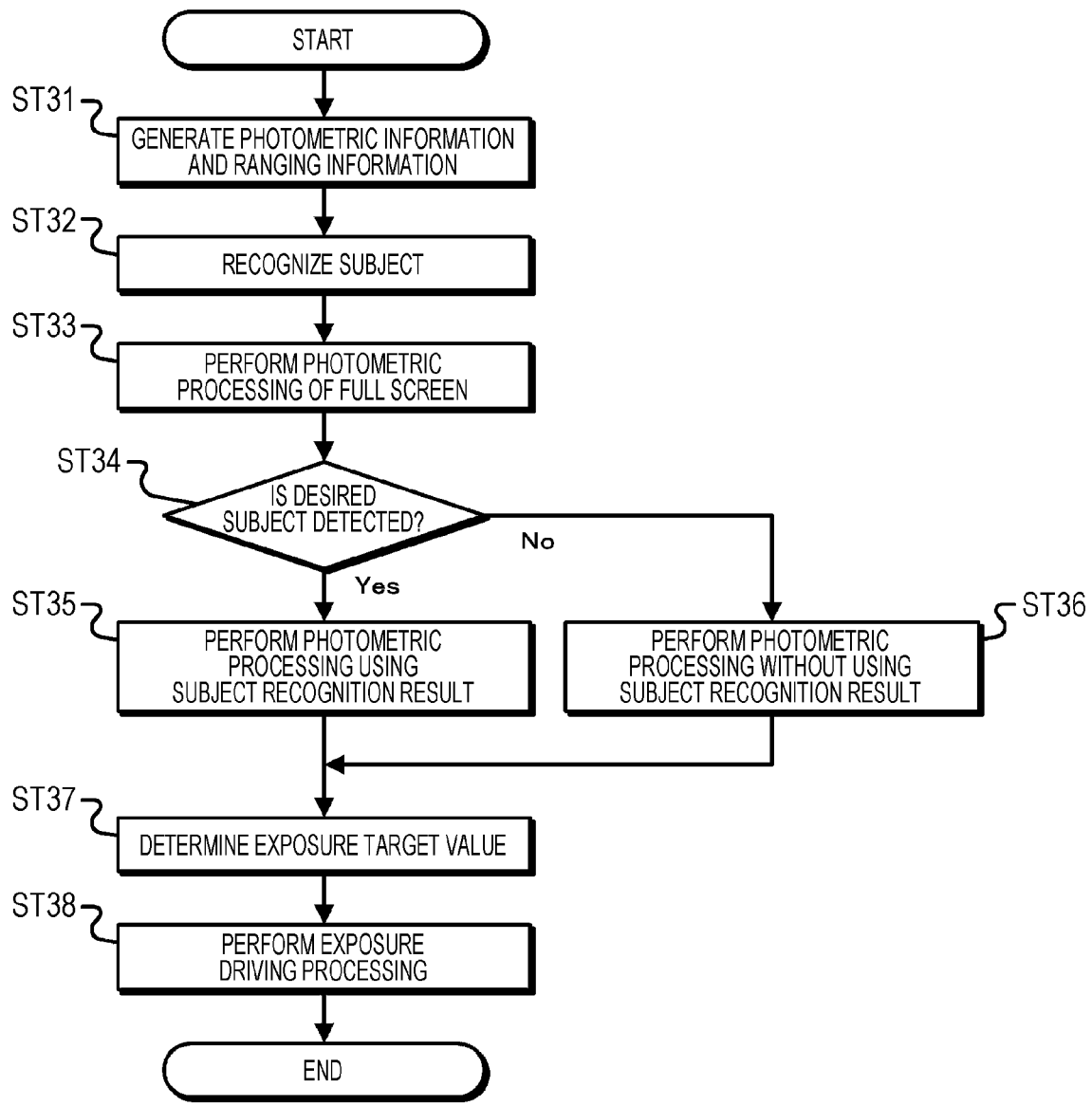
FIG. 14 is a flowchart illustrating another operation of the capturing device.

FIG. 14 is a flowchart illustrating another operation of the capturing device. In Step ST31, the capturing device generates the photometric information and the ranging information. The photometric unit 23 of the capturing device 20 generates the photometric information, outputs the photometric information to the control unit 30, and the ranging unit 24 generates the ranging information, and outputs the ranging information to the control unit 30*a*.

In Step ST32, the capturing device performs the subject recognition. The subject recognition unit 25 of the capturing device 20 performs the subject recognition, and outputs the subject recognition result indicating the region division result for each of the subjects or a characteristic portion detection result of the desired subject to the control unit 30*a*.

In Step ST33, the capturing device performs the photometric processing of the entire screen. The full-screen photometric value calculation unit 34 of the control unit 30*a* calculates the full-screen photometric value that is the photometric value with respect to the entire capturing range by using the photometric value for each of the photometric regions.

In Step ST34, the capturing device discriminates whether or not the desired subject is detected. In the control unit 30*a*, in a case where the desired subject is detected according to the subject recognition result of the subject recognition unit 25, the process proceeds to Step ST35, and in a case where the desired subject is not detected, the process proceeds to Step ST36.

In Step ST35, the capturing device performs the photometric processing using the subject recognition result. The subject region discrimination unit 31 of the control unit 30 discriminates the ranging region indicating the desired distance as the subject region, on the basis of the ranging information. In addition, the subject photometric region setting unit 32*a* performs the clustering processing by using the discrimination result of the subject region, and sets the subject photometric region that is the photometric region corresponding to the desired subject. In addition, the subject photometric region setting unit 32*a* may set the subject photometric region by using the region division result indicated by the subject recognition result. The photometric value calculation unit 33*a*, for example, may perform at least any one of the weighting according to the position in the subject photometric region and the designation of the ranging region in the focusing state, or the weighting based on the subject recognition result, with respect to the photometric value of the subject photometric region. Further, the photometric value calculation unit 33*a* calculates the subject photometric value of the desired subject by using the photometric value after the weighting, and the process proceeds to Step ST37.

In Step ST36, the capturing device performs the photometric processing without using the subject recognition result. The subject region discrimination unit 31 of the control unit 30 discriminates the ranging region indicating the desired distance as the subject region, on the basis of the ranging information. In addition, the subject photometric region setting unit 32*a* performs the clustering processing by using the discrimination result of the subject region, and sets the subject photometric region that is the photometric region corresponding to the desired subject. Further, the photometric value calculation unit 33 calculates the subject photometric value of the desired subject by using the photometric value of the subject photometric region, and the process proceeds to Step ST37.

In Step ST37, the capturing device determines the exposure target value. The exposure control unit 35 of the control unit 30 determines the exposure target value on the basis of the full-screen photometric value calculated in Step ST33, and the subject photometric value calculated in Step ST35 or Step ST36, and the process proceeds to Step ST38.

In Step ST38, the control device performs the exposure driving processing. The exposure control unit 35 of the control unit 30 generates the control signal such that the exposure target value determined in Step ST37 is obtained, and sets the diaphragm mechanism of the capturing optical system 21, the exposure time of the capturing unit 22, the ISO sensitivity with respect to the camera signal processing unit 41, and the like.

Furthermore, another operation of the capturing device is not limited to the operation illustrated in FIG. 14, and may include the processing of Step ST21 or the processing of Step ST22 relevant to the automatic focus illustrated in FIG. 12. In addition, the photometric processing of the entire screen may be performed before Step ST32, or may be performed after Step ST35 or Step ST36.

As described above, in the capturing device of the present technology, the photometric value is calculated by using the subject recognition result, and thus, it is possible to more reliably and accurately calculate the subject photometric value of the desired subject, compared to a case where the subject recognition result is not used.

6. Application Example

<6-1. Application Example with Respect to Mobile Object Control System>

The technology according to this disclosure can be applied to various products. For example, the technology according to this disclosure may be realized as a device that is mounted on any type of mobile object such as an automobile, an electric vehicle, a hybrid electric vehicle, a motorcycle, a bicycle, a personal mobility, an airplane, a drone, a vessel, a robot, a construction machine, and an agricultural machine (a tractor).

Figure 15:
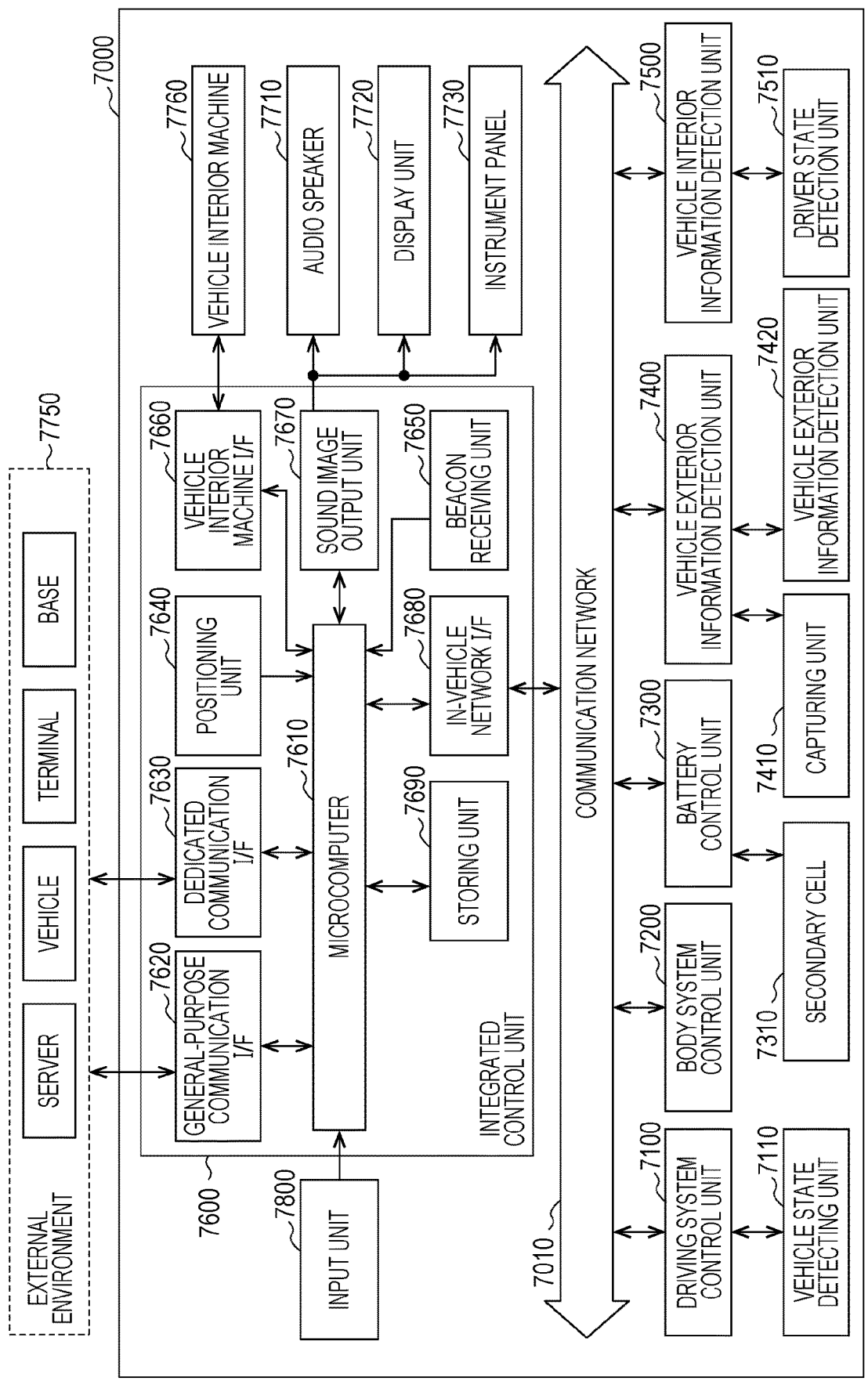
FIG. 15 is a block diagram illustrating an example of a schematic configuration of a vehicle control system.

FIG. 15 is a block diagram illustrating a schematic configuration example of a vehicle control system 7000 that is an example of a mobile object control system obtained by applying the technology according to this disclosure. The vehicle control system 7000 includes a plurality of electronic control units connected to each other through a communication network 7010. In the example illustrated in FIG. 15, the vehicle control system 7000 includes a driving system control unit 7100, a body system control unit 7200, a battery control unit 7300, a vehicle exterior information detection unit 7400, a vehicle interior information detection unit 7500, and an integrated control unit 7600. The communication network 7010 connecting such a plurality of control units to each other, for example, may be an in-vehicle communication network based on an arbitrary standard such as a controller area network (CAN), a local interconnect network (LIN), a local area network (LAN), or FlexRay (Registered Trademark).

Each of the control units includes a microcomputer performing arithmetic operation processing according to various programs, a storage unit storing the programs executed by the microcomputer, parameters used in various arithmetic operations, and the like, and a driving circuit driving a device to be subjected to various controls. Each of the control units includes a network I/F for performing communication with respect to the other control unit through the communication network 7010, and includes a communication I/F for performing communication with respect to vehicle interior and exterior devices, sensors, and the like according to wired communication or wireless communication. In FIG. 15, a microcomputer 7610, a general-purpose communication I/F 7620, a dedicated communication I/F 7630, a positioning unit 7640, a beacon reception unit 7650, a vehicle interior machine I/F 7660, a sound image output unit 7670, an in-vehicle network I/F 7680, and a storage unit 7690 are illustrated as a functional configuration of the integrated control unit 7600. Similarly, the other control unit also includes a microcomputer, a communication I/F, a storage unit, and the like.

The driving system control unit 7100 controls the operation of a device relevant to a driving system of a vehicle according to various programs. For example, the driving system control unit 7100 functions as a control device of a driving force generating device for generating a vehicle driving force for an internal-combustion engine, a driving motor, and the like, a driving force transmission mechanism for transmitting a driving force to a wheel, a steering mechanism adjusting a rudder angle of a vehicle, a braking device generating a vehicle braking force, and the like. The driving system control unit 7100 may function as a control device of an antilock brake system (ABS), electronic stability control (ESC), and the like.

A vehicle state detection unit 7110 is connected to the driving system control unit 7100. The vehicle state detection unit 7110, for example, includes at least one of a gyroscope sensor detecting an angular rate of an axial rotation of a vehicle body, an acceleration rate sensor detecting an acceleration rate of a vehicle, or a sensor for detecting an operation amount of an accelerator pedal, an operation amount of a brake pedal, a rudder angle of a steering wheel, an engine speed, a rotation rate of a wheel, and the like. The driving system control unit 7100 performs arithmetic operation processing by using a signal input from the vehicle state detection unit 7110, and controls an internal-combustion engine, a driving motor, an electric power steering device, a brake device, and the like.

The body system control unit 7200 controls the operation of various devices mounted on the vehicle body according to various programs. For example, the body system control unit 7200 functions as a control device of a keyless entry system, a smart key system, a power window device, or various lamps such as head lamp, a back lamp, a brake lamp, an indicator, or a fog lamp. In this case, electric waves transmitted from a portable device substituting for a key or signals of various switches can be input into the body system control unit 7200. The body system control unit 7200 receives the input of the electric waves or the signals, and controls the door lock device, the power window device, the lamp, and the like of the vehicle.

The battery control unit 7300 controls a secondary cell 7310 that is a power supply source of the driving motor according to various programs. For example, information such as a battery temperature, a battery output voltage, or battery remaining capacity is input into the battery control unit 7300 from a battery device including the secondary cell 7310. The battery control unit 7300 performs the arithmetic operation processing by using such signals, and performs temperature adjustment control of the secondary cell 7310, the control of a cooling device included in the battery device, and the like.

The vehicle exterior information detection unit 7400 detects exterior information of the vehicle provided with the vehicle control system 7000. For example, at least one of a capturing unit 7410 or a vehicle exterior information detection unit 7420 is connected to the vehicle exterior information detection unit 7400. The capturing unit 7410 includes at least one of a time of flight (ToF) camera, a stereo camera, a monocular camera, an infrared camera, or other cameras. The vehicle exterior information detection unit 7420, for example, includes at least one of an environment sensor for detecting current weather or meteorological phenomenon or a surrounding information detection sensor for detecting other vehicles around the vehicle provided with the vehicle control system 7000, an obstacle, a pedestrian, and the like.

The environment sensor, for example, may be at least one of a raindrop sensor detecting rain, a fog sensor detecting fog, a solar irradiation sensor detecting the degree of solar irradiation, or a snow sensor detecting snow. The surrounding information detection sensor may be at least one of an ultrasonic sensor, a radar device, or a light detection and ranging (laser imaging detection and ranging, LIDAR) device. The capturing unit 7410 and the vehicle exterior information detection unit 7420 may be respectively provided as an independent sensor or device, or may be provided as a device in which a plurality of sensors or devices is integrated.

Figure 16:
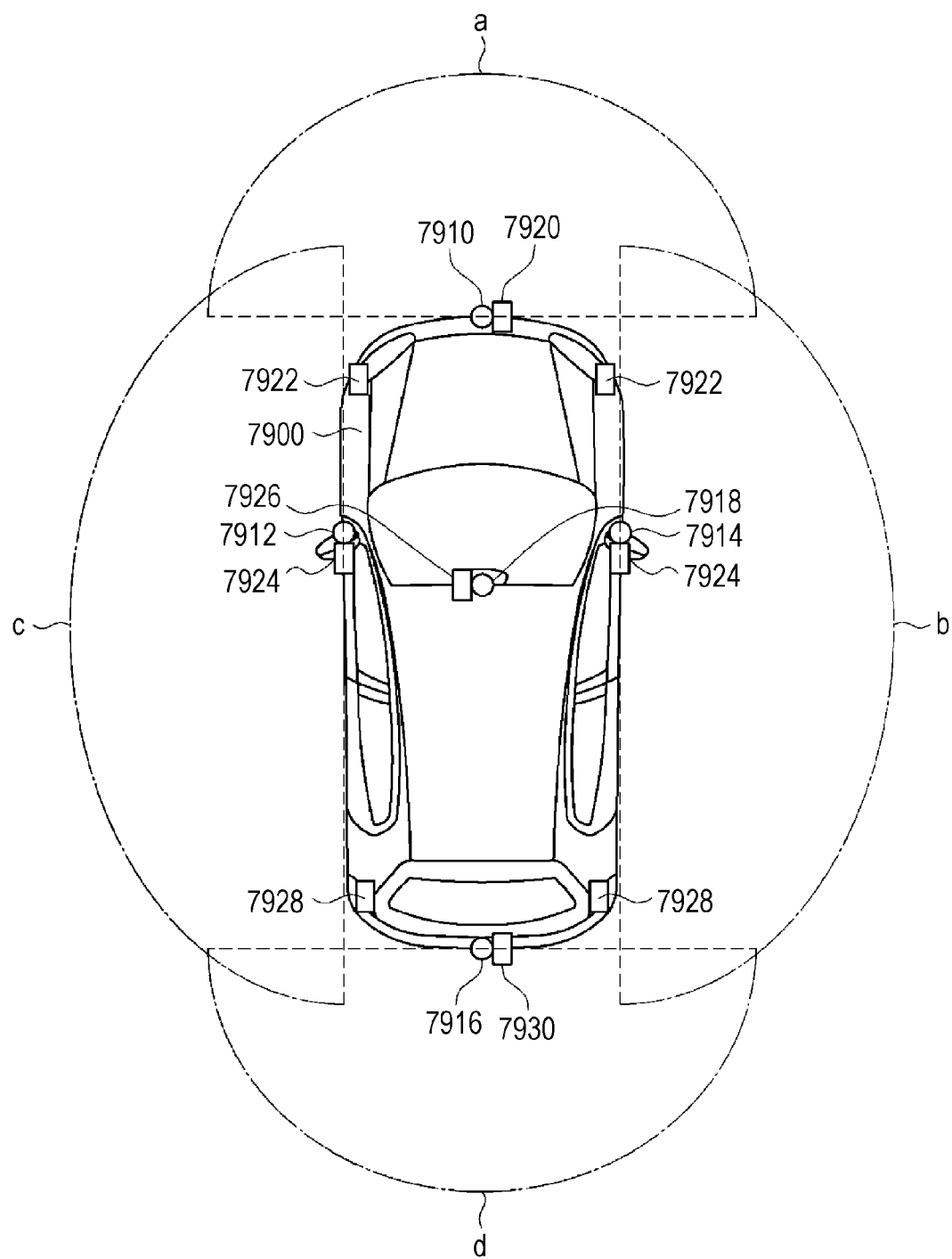
FIG. 16 is an explanatory diagram illustrating an example of an installation position of a vehicle exterior information detection unit and a capturing unit.

Here, FIG. 16 illustrates an example of an installation position of the capturing unit 7410 and the vehicle exterior information detection unit 7420. Capturing units 7910, 7912, 7914, 7916, 7918, for example, are provided in at least one position of a front nose, a side mirror, a rear bumper, a back door of a vehicle 7900, or an upper of front glass in the vehicle. The capturing unit 7910 that is provided in the front nose and the capturing unit 7918 that is provided in the upper portion of the front glass in the vehicle mainly acquire a front image of the vehicle 7900. The capturing units 7912 and 7914 that are provided in the side mirror mainly acquire a lateral image of the vehicle 7900. The capturing unit 7916 that is provided in the rear bumper or the back door mainly acquires a rear image of the vehicle 7900. The capturing unit 7918 that is provided in the upper portion of the front glass in the vehicle is mainly used for detecting a leading vehicle, a pedestrian, an obstacle, a traffic light, a traffic sign, a traffic lane, and the like.

Furthermore, in FIG. 16, an example of a capturing range of each of the capturing units 7910, 7912, 7914, and 7916 is illustrated. A capturing range a indicates the capturing range of the capturing unit 7910 that is provided in the front nose, capturing ranges b and c respectively indicate the capturing range of the capturing units 7912 and 7914 that are provided in the side mirror, and a capturing range d indicates the capturing range of the capturing unit 7916 that is provided in the rear bumper or the back door. For example, image data items captured by the capturing units 7910, 7912, 7914, and 7916 overlap with each other, and thus, an overhead image of the vehicle 7900 seen from the above is obtained.

Vehicle exterior information detection units 7920, 7922, 7924, 7926, 7928, and 7930 provided on the front, the rear, the side, and the corner of the vehicle 7900, and the upper portion of the front glass in the vehicle, for example, may be an ultrasonic sensor or a radar device. The vehicle exterior information detection units 7920, 7926, and 7930 that are provided in the front nose, the rear bumper, and the back door of the vehicle 7900, and in the upper portion of the front glass in the vehicle, for example, may be an LIDAR device. The vehicle exterior information detection units 7920 to 7930 are mainly used for detecting a leading vehicle, a pedestrian, an obstacle, and the like.

Return to FIG. 15, and the description will be continued. The vehicle exterior information detection unit 7400 allows the capturing unit 7410 to capture a vehicle exterior image, and receives captured image data. In addition, the vehicle exterior information detection unit 7400 receives detection information from the vehicle exterior information detection unit 7420 that is connected to the vehicle exterior information detection unit 7400. In a case where the vehicle exterior information detection unit 7420 is an ultrasonic sensor, a radar device, or an LIDAR device, the vehicle exterior information detection unit 7400 emits an ultrasonic wave, an electromagnetic wave, and the like, and receives information of a received reflection wave. The vehicle exterior information detection unit 7400 may perform object detection processing of a person, a vehicle, an obstacle, a sign, characters on a road surface, and the like, or distance detection processing, on the basis of the received information. The vehicle exterior information detection unit 7400 may perform environment recognition processing of recognizing rain, fog, a road surface situation, and the like, on the basis of the received information. The vehicle exterior information detection unit 7400 may calculate a distance to an object outside the vehicle, on the basis of the received information.

In addition, the vehicle exterior information detection unit 7400 may perform the image recognition processing of recognizing a person, a vehicle, an obstacle, a sign, characters on a road surface, and the like, or the distance detection processing, on the basis of the received image data. The vehicle exterior information detection unit 7400 may perform processing such as distortion correction, positioning, and the like with respect to the received image data, may synthesize the image data captured by the different capturing unit 7410, and may generate an overhead image or a panorama image. The vehicle exterior information detection unit 7400 may perform viewpoint conversion processing by using the image data captured by the different capturing unit 7410.

The vehicle interior information detection unit 7500 detects information inside the vehicle. For example, a driver state detection unit 7510 detecting a driver state is connected to the vehicle interior information detection unit 7500. The driver state detection unit 7510 may include a camera capturing a driver, a biological sensor detecting biological information of the driver, a microphone collecting a sound in the vehicle, and the like. The biological sensor, for example, is provided on a seating surface, a steering wheel, and the like, and detects the biological information of a passenger who is sitting on a seat or the driver who is holding the steering wheel. The vehicle interior information detection unit 7500 may calculate a fatigue degree or a concentration degree of the driver on the basis of the detection information input from the driver state detection unit 7510, and may discriminate whether or not the driver dozes off. The vehicle interior information detection unit 7500 may perform processing such as noise canceling processing with respect to the collected sound signals.

The integrated control unit 7600 controls the overall operation in the vehicle control system 7000 according to various programs. An input unit 7800 is connected to the integrated control unit 7600. The input unit 7800, for example, is realized by a device that is capable of performing an input operation of the passenger, such as a touch panel, a button, a microphone, a switch, or a lever. Data obtained by performing sound recognition with respect to a sound input from the microphone may be input into the integrated control unit 7600. The input unit 7800, for example, may be a remote control device using an infrared ray or other electric waves, or may be an external connection machine such as a mobile telephone or a personal digital assistant (PDA) corresponding to the operation of the vehicle control system 7000. The input unit 7800, for example, may be a camera, and in this case, the passenger is capable of inputting information with a gesture. Alternatively, data obtained by detecting the motion of a wearable device that is mounted on the passenger may be input. Further, the input unit 7800, for example, may include an input control circuit that generates an input signal by using the input unit 7800 described above, on the basis of the information input by the passenger and the like, and outputs the input signal to the integrated control unit 7600, and the like. The passenger and the like operate the input unit 7800, and thus, input various data items or instruct a processing operation with respect to the vehicle control system 7000.

The storage unit 7690 may include a read only memory (ROM) that stores various programs to be executed by a microcomputer, and a random access memory (RAM) that stores various parameters, an arithmetic operation result, a sensor value, and the like. In addition, the storage unit 7690 may be realized by a magnetic storage device such as a hard disc drive (HDD), a semiconductor storage device, an optical storage device, a magnetooptical storage device, and the like.

The general-purpose communication I/F 7620 is a general-purpose communication I/F that mediates communication with respect to various machines existing in an external environment 7750. The general-purpose communication I/F 7620 may be provided with other wireless communication protocols such as global system of mobile communications (GSM, Registered Trademark), WiMAX (Registered Trademark), a cellular communication protocol such as long term evolution (LTE, Registered Trademark) or LTE-advanced (LTE-A), a wireless LAN (also referred to as Wi-Fi (Registered Trademark)), and Bluetooth (Registered Trademark). The general-purpose communication I/F 7620, for example, may be connected to a machine (for example, an application server or a control server) existing on an external network (for example, the internet, a cloud network, or a business-specific network), through a base station or an access point. In addition, the general-purpose communication I/F 7620, for example, may be connected to a terminal existing in the vicinity of the vehicle (for example, a terminal of the driver, the pedestrian, or a store, or a machine type communication (MTC) terminal) by using a peer to peer (P2P) technology.

The dedicated communication I/F 7630 is a communication I/F supporting a communication protocol that is designed to be used in the vehicle. The dedicated communication I/F 7630, for example, may be provided with a standard protocol that is a combination of IEEE802.11p of a low-order layer and IEEE1609 of a high-order layer, such as wireless access in vehicle environment (WAVE), dedicated short range communications (DSRC), or a cellular communication protocol. The dedicated communication I/F 7630 typically performs V2X communication that is a concept including one or more of vehicle to vehicle communication, vehicle to infrastructure communication, vehicle to home communication, and vehicle to pedestrian communication.

The positioning unit 7640, for example, receives a GNSS signal from a global navigation satellite system (GNSS) satellite (for example, a GPS signal from a global positioning system (GPS) satellite), executes positioning, and generates position information including the latitude, the longitude, and the altitude of the vehicle. Furthermore, the positioning unit 7640 may specify the current position by exchanging a signal with respect to a wireless access point, or may acquire the position information from a terminal having a positioning function, such as a mobile telephone, a PHS, or a smart phone.

The beacon reception unit 7650, for example, receives an electric wave or an electromagnetic wave that is emitted from a wireless station or the like provided on the road, and acquires information such as the current position, traffic jam, road closure, or required time. Furthermore, the function of the beacon reception unit 7650 may be included in the dedicated communication I/F 7630 described above.

The vehicle interior machine I/F 7660 is a communication interface that mediates connection between the microcomputer 7610 and various vehicle interior machines 7760 existing inside the vehicle. The vehicle interior machine I/F 7660 may establish wireless connection by using a wireless communication protocol such as a wireless LAN, Bluetooth (Registered Trademark), near field communication (NFC), or a wireless USB (WUSB). In addition, the vehicle interior machine I/F 7660 may establish wired connection of universal serial bus (USB), a high-definition multimedia interface (HDMI, Registered Trademark), or a mobile high-definition link (MHL), and the like, through a connection terminal (not illustrated, and a cable as necessary). The vehicle interior machine 7760, for example, may include at least one of a mobile machine or a wearable machine of the passenger, or an information machine that is installed in or attached to the vehicle. In addition, the vehicle interior machine 7760 may include a navigation device performing route search of an arbitrary destination. The vehicle interior machine I/F 7660 exchanges a control signal or a data signal with respect to the vehicle interior machine 7760.

The in-vehicle network I/F 7680 is an interface that mediates communication between the microcomputer 7610 and the communication network 7010. The in-vehicle network I/F 7680 transmits and receives a signal and the like, according to a predetermined protocol that is supported by the communication network 7010.

The microcomputer 7610 of the integrated control unit 7600 controls the vehicle control system 7000 according to various programs, on the basis of the information acquired through at least one of the general-purpose communication I/F 7620, the dedicated communication I/F 7630, the positioning unit 7640, the beacon reception unit 7650, the vehicle interior machine I/F 7660, or the in-vehicle network I/F 7680. For example, the microcomputer 7610 may perform an arithmetic operation with respect to a control target value of the driving force generating device, the steering mechanism, or the braking device, on the basis of the acquired vehicle interior and exterior information, and may output a control command to the driving system control unit 7100. For example, the microcomputer 7610 may perform cooperative control for realizing the function of an advanced driver assistance system (ADAS) including collision avoidance or impact relaxation of a vehicle, following traveling based on an inter-vehicular distance, vehicle speed maintaining traveling, collision warning of a vehicle, lane deviation warning of a vehicle, and the like. In addition, the microcomputer 7610 controls the driving force generating device, steering mechanism, the braking device, and the like on the basis of acquired surrounding information of the vehicle, and thus, may perform cooperative control for automated driving or the like in which a vehicle autonomously travels regardless of the operation of the driver.

The microcomputer 7610 may generate three-dimensional distance information between the vehicle and an object such as a peripheral structure or figure, on the basis of the information acquired through at least one of the general-purpose communication I/F 7620, the dedicated communication I/F 7630, the positioning unit 7640, the beacon reception unit 7650, the vehicle interior machine I/F 7660, or the in-vehicle network I/F 7680, and may prepare local map information including peripheral information of the current position of the vehicle. In addition, the microcomputer 7610 may predict danger such as the collision of a vehicle, the approach of a pedestrian or the like, or the entrance to a road of road closure, and may generate a warning signal, on the basis of the acquired information. The warning signal, for example, may be a signal for generating a warning sound or for lighting up a warning lamp.

The sound image output unit 7670 transmits at least one output signal of a sound or an image to an output device that is capable of visually or aurally notifying information to the passenger of the vehicle or to the outside of the vehicle. In the example of FIG. 15, an audio speaker 7710, a display unit 7720, and an instrument panel 7730 are exemplified as the output device. The display unit 7720, for example, may include at least one of an on-board display or a head-up display. The display unit 7720 may have an augmented reality (AR) display function. The output device may be a device other than the devices described above, such as a headphone, a wearable device that is mounted on the passenger, such as an eyeglasses type display, a projector, or a lamp. In a case where the output device is a display device, the display device visually displays results obtained from various processings of the microcomputer 7610 or the information received from the other control unit, in various formats such as a text, an image, a table, and a graph. In addition, in a case where the output device is a sound output device, the sound output device converts an audio signal including reproduced sound data, acoustic data, and the like, into an analog signal, and aurally outputs the signal.

Furthermore, in the example illustrated in FIG. 15, at least two control units connected to each other through the communication network 7010 may be integrated as one control unit. Alternatively, each of the control units includes a plurality of control units. Further, the vehicle control system 7000 may include another control unit (not illustrated). In addition, in the above description, a part or all of the functions of any control unit may be provided in the other control unit. That is, predetermined arithmetic operation processing may be performed by any control unit insofar as the information is transmitted and received through the communication network 7010. Similarly, a sensor or a device connected to any control unit may be connected to the other control unit, and a plurality of control units may transmit and receive detection information with respect to each other through the communication network 7010.

Furthermore, a computer program for realizing each function of the information processing device 100 according to this embodiment, described by using FIG. 15, can be provided in any control unit and the like. In addition, a computer-readable recording medium in which such a computer program is stored can be provided. The recording medium, for example, is a magnetic disk, an optical disk, a magnetooptical disk, a flash memory, and the like. In addition, the computer program described above may be distributed, for example, through a network without using the recording medium.

In the vehicle control system 7000 described above, the present technology can be applied to the capturing unit 7410 illustrated in FIG. 15, or the capturing units 7910, 7912, 7914, 7916, and 7918 illustrated in FIG. 16. As described above, in a case where the present technology is applied to the capturing units 7410, 7910, 7912, 7914, 7916, and 7918, it is possible to accurately acquire the photometric value of the subject outside the vehicle, and to perform optimal exposure control according to the subject, and thus, for example, it is possible to easily recognize the subject outside the vehicle, and it is possible to reduce the fatigue of the driver, and the like. In addition, it is possible to acquire information necessary for automated driving and the like with a high accuracy.

<6-2. Application Example with Respect to Endoscopic Surgery System>

The technology according to this disclosure, for example, may be applied to an endoscopic surgery system.

Figure 17:
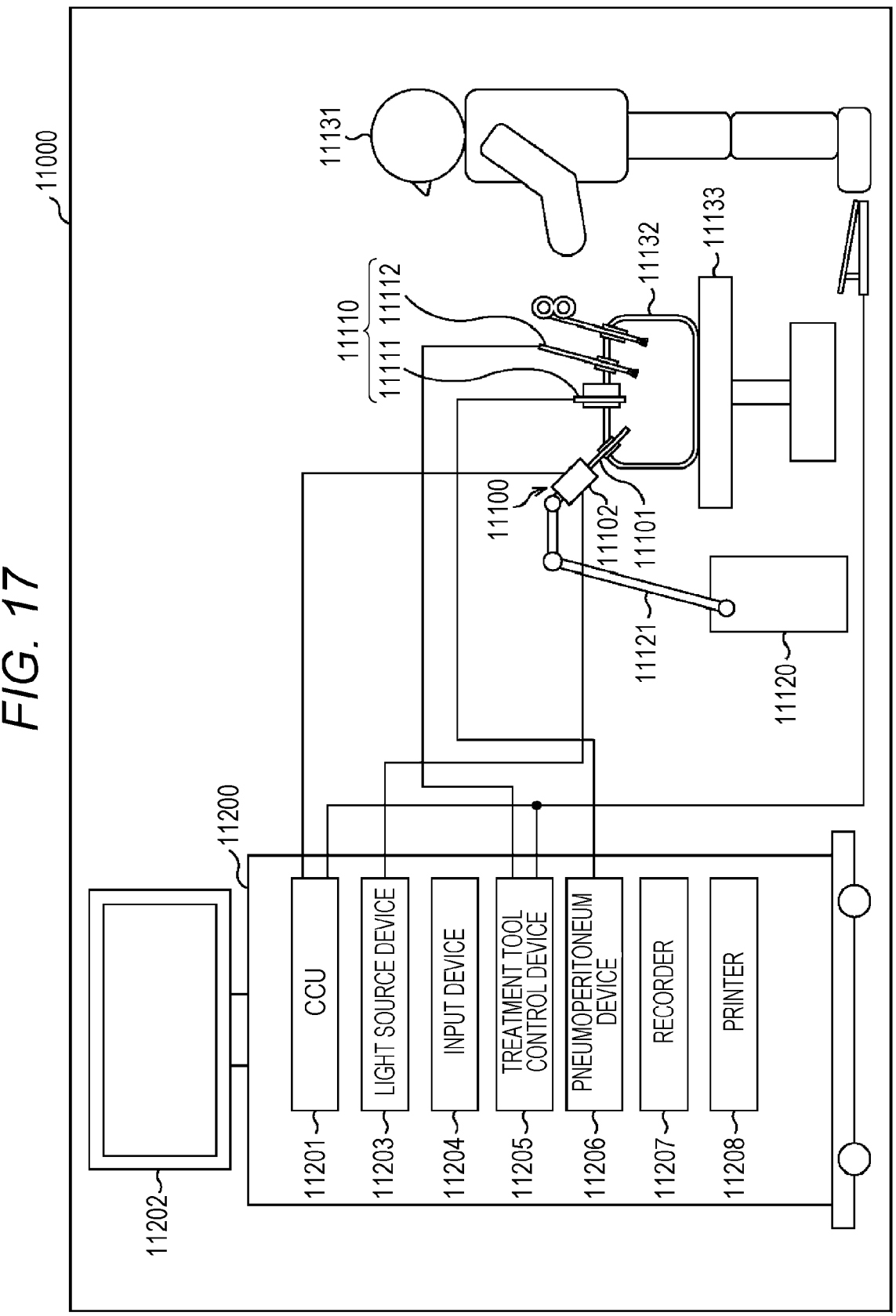
FIG. 17 is a diagram illustrating an example of a schematic configuration of an endoscopic surgery system.

FIG. 17 is a diagram illustrating an example of a schematic configuration of an endoscopic surgery system to which the technology according to this disclosure (the present technology) can be applied.

In FIG. 17, it is illustrated that a surgical operator (a surgeon) 11131 performs surgery with respect to a patient 11132 on a patient bed 11133 by using an endoscopic surgery system 11000. As illustrated, the endoscopic surgery system 11000 includes an endoscope 11100, other surgical tools 11110 such as a pneumoperitoneum tube 11111 or an energy treatment tool 11112, a support arm device 11120 supporting the endoscope 11100, and a cart 11200 in which various devices for endoscopic surgery are provided.

The endoscope 11100 includes a lens tube 11101 of which a region having a predetermined length is inserted into the body cavity of a patient 11132 from a tip end, and a camera head 11102 connected to a base end of the lens tube 11101. In the illustrated example, the endoscope 11100 that is configured as a so-called rigid tube including the rigid lens tube 11101 is illustrated, but the endoscope 11100 may be configured as a so-called flexible scope including a flexible lens tube.

An opening portion into which an objective lens is fitted is provided on the tip end of the lens tube 11101. A light source device 11203 is connected to the endoscope 11100, and light generated by the light source device 11203 is guided to the tip end of the lens tube by a light guide that extends in the lens tube 11101, and is emitted to an observation target in the body cavity of the patient 11132 through the objective lens. Furthermore, the endoscope 11100 may be a direct-view scope, or may be an oblique-view scope or a side-view scope.

An optical system and a capturing element are provided in the camera head 11102, reflection light (observation light) from the observation target is collected in the capturing element by the optical system. The observation light is subjected to photoelectric conversion by the capturing element, and an electric signal corresponding to the observation light, that is an image signal corresponding to an observation image is generated. The image signal is transmitted to a camera control unit (CCU) 11201 as RAW data.

The CCU 11201 includes a central processing unit (CPU), a graphics processing unit (GPU), and the like, and comprehensively controls the operation of the endoscope 11100 and the display device 11202. Further, the CCU 11201 receives the image signal from the camera head 11102, and for example, performs various image processings for displaying an image based on the image signal, such as developing processing (demosaic processing), with respect to the image signal.

The display device 11202 displays the image based on the image signal subjected to the image processing by the CCU 11201, according to the control of the CCU 11201.

The light source device 11203, for example, includes a light source such as a light emitting diode (LED), and supplies irradiation light at the time of capturing a surgical portion and the like to the endoscope 11100.

An input device 11204 is an input interface with respect to the endoscopic surgery system 11000. The user is capable of inputting various information items or instructions into the endoscopic surgery system 11000 through the input device 11204. For example, the user inputs an instruction to change a capturing condition of the endoscope 11100 (the type of irradiation light, a magnification, a focal point distance, and the like), and the like.

A treatment tool control device 11205 controls the driving of the energy treatment tool 11112 for the ablation and the incision of a tissue, the sealing of a blood vessel, and the like. A pneumoperitoneum device 11206 swells out the body cavity of the patient 11132 in order to ensure a viewing field of the endoscope 11100 and to ensure a working space of the surgical operator, and thus, sends gas into the body cavity through the pneumoperitoneum tube 11111. A recorder 11207 is a device that is capable of recording various information items relevant to the surgery. A printer 11208 is a device that is capable of printing various information items relevant to the surgery in various formats such as a text, an image, or a graph.

Furthermore, the light source device 11203 supplying the irradiation light at the time of capturing the surgical portion to the endoscope 11100, for example, can be configured as a white light source including an LED, a laser light source, or a combination thereof. In a case where the white light source includes a combination of RGB laser light sources, it is possible to control an output intensity and an output timing of each color (each wavelength) with a high accuracy, and thus, it is possible to adjust a white balance of the captured image in the light source device 11203. In addition, in this case, laser light from each of the RGB laser light source is emitted to the observation target in a time-division manner, the driving of the capturing element of the camera head 11102 is controlled in synchronization with an irradiation timing, and thus, it is possible to capture images respectively corresponding to RGB in a time-division manner. According to the method, it is possible to obtain a color image without providing a color filter in the capturing element.

In addition, the driving of the light source device 11203 may be controlled such that a light intensity to be output is changed for each predetermined time. The driving of the capturing element of the camera head 11102 is controlled in synchronization with a change timing of the light intensity, images are acquired in a time-division manner, and the images are synthesized, and thus, it is possible to generate an image in a high dynamic range without having so-called black defects and halation.

In addition, the light source device 11203 may be configured such that light of a predetermined wavelength band corresponding to special light observation can be supplied. In the special light observation, for example, narrow-band light is emitted by using wavelength dependency of light absorption in a body system, compared to irradiation light at the time of performing general observation (that is, white light), and thus, so-called narrow-band light observation (narrow band imaging) is performed in which a predetermined tissue of a blood vessel or the like on a front surface of a mucosal membrane is captured with a high contrast. Alternatively, in the special light observation, fluorescent observation may be performed in which an image is obtained by fluorescent light that is generated by emitting excitation light. In the fluorescent observation, the body system can be irradiated with the excitation light, and the fluorescent light from the body system can be observed (autogenous fluorescent observation), or a reagent such as indocyanine green (ICG) can be locally injected into the body system, the body system can irradiated with excitation light corresponding to a fluorescent wavelength of the reagent, and a fluorescent image can be obtained. The light source device 11203 can be configured such that the narrow-band light and/or the excitation light corresponding to such special light observation can be supplied.

FIG. 18 is a block diagram illustrating an example of a functional configuration of the camera head 11102 and the CCU 11201 illustrated in FIG. 17.

The camera head 11102 includes a lens unit 11401, a capturing unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are connected to each other through a transmission cable 11400 such that communication can be performed.

The lens unit 11401 is an optical system that is provided in a connection portion with respect to the lens tube 11101. The observation light taken from the tip end of the lens tube 11101 is guided to the camera head 11102, and is incident on the lens unit 11401. The lens unit 11401 is configured by combining a plurality of lenses including a zoom lens and a focus lens.

The capturing element configuring the capturing unit 11402 may be one capturing element (a so-called single-plate type capturing unit), or may be a plurality of capturing elements (a so-called multi-plate type capturing unit). In a case where the capturing unit 11402 is configured as the multi-plate type capturing unit, for example, image signals respectively corresponding to RGB may be generated by each of the capturing elements, and may be synthesized, and thus, a color image may be obtained. Alternatively, the capturing unit 11402 may be configured to include a pair of capturing elements for respectively acquiring image signals for a right eye and a left eye corresponding to three-dimensional (3D) display. The 3D display is performed, and thus, the surgical operator 11131 is capable of more accurately grasping the depth of a biological tissue in the surgical portion. Furthermore, in a case where the capturing unit 11402 is configured as the multi-plate type capturing unit, a plurality of lens units 11401 can also be provided corresponding to each of the capturing elements.

In addition, it is not necessary that the capturing unit 11402 is provided in the camera head 11102. For example, the capturing unit 11402 may be provided immediately after the objective lens in the lens tube 11101.

The driving unit 11403 includes an actuator, and moves the zoom lens and the focus lens of the lens unit 11401 along an optical axis by only a predetermined distance, according to the control from the camera head control unit 11405. With this arrangement, the magnification and the focal point of the captured image in the capturing unit 11402 can be suitably adjusted.

The communication unit 11404 includes a communication device for transmitting and receiving various information items with respect to the CCU 11201. The communication unit 11404 transmits the image signal obtained from the capturing unit 11402 to the CCU 11201 through the transmission cable 11400, as the RAW data.

In addition, the communication unit 11404 receives the control signal for controlling the driving of the camera head 11102 from the CCU 11201, and supplies the control signal to the camera head control unit 11405. The control signal, for example, includes information associated with the capturing condition, such as information to designate a frame rate of the captured image, information to designate an exposure value at the time of performing capturing, and/or information to designate the magnification and the focal point of the captured image.

Furthermore, the capturing condition such as the frame rate or the exposure value, the magnification, and the focal point, described above, may be suitably designated by the user, or may be automatically set by the control unit 11413 of the CCU 11201 on the basis of the acquired image signal. In the latter case, a so-called auto exposure (AE) function, an auto focus (AF) function, and an auto white balance (AWB) function are provided in the endoscope 11100.

The camera head control unit 11405 controls the driving of the camera head 11102 on the basis of the control signal from the CCU 11201 received through the communication unit 11404.

The communication unit 11411 includes a communication device for transmitting and receiving various information items with respect to the camera head 11102. The communication unit 11411 receives the image signal that is transmitted from the camera head 11102 through the transmission cable 11400.

In addition, the communication unit 11411 transmits the control signal for controlling the driving of the camera head 11102 to the camera head 11102. The image signal or the control signal can be transmitted according to electric communication, optical communication, and the like.

The image processing unit 11412 performs various image processings with respect to the image signal that is the RAW data transmitted from the camera head 11102.

The control unit 11413 performs various controls relevant to the capturing of the surgical portion and the like of the endoscope 11100, and the display of the captured image that is obtained by capturing the surgical portion and the like. For example, the control unit 11413 generates the control signal for controlling the driving of the camera head 11102.

In addition, the control unit 11413 allows the captured image reflecting the surgical portion and the like to be displayed on the display device 11202, on the basis of the image signal subjected to the image processing by the image processing unit 11412. At this time, the control unit 11413 may recognize various objects in the captured image by using various image recognition technologies. For example, the control unit 11413 detects the shape, the color, and the like of the edge of the object that is included in the captured image, and thus, it is possible to recognize a surgical tool such as forceps, a specific biological portion, bleeding, mist at the time of using the energy treatment tool 11112, and the like. The control unit 11413 may allow various surgery support information items to be superimposedly displayed on the image of the surgical portion by using a recognition result at the time of displaying the captured image on the display device 11202. The surgery support information is superimposedly displayed, and is presented to the surgical operator 11131, and thus, it is possible to reduce the load of the surgical operator 11131, and it is possible for the surgical operator 11131 to reliably perform the surgery.

The transmission cable 11400 connecting the camera head 11102 and the CCU 11201 to each other is an electric signal cable corresponding to the communication of the electric signal, an optical fiber corresponding to optical communication, or a composite cable thereof.

Here, in the illustrated example, communication is performed in a wired manner by using the transmission cable 11400, but communication between the camera head 11102 and the CCU 11201 may be performed in a wireless manner.

In the endoscopic surgery system 11000 described above, the present technology can be applied to the endoscope 11100 illustrated in FIG. 17 or the capturing unit 11402 illustrated in FIG. 18. As described above, in a case where the present technology is applied to the endoscope 11100 or the capturing unit 11402, it is possible to accurately acquire the photometric value of the surgical portion and the like, and it is possible to perform optimal exposure control according to the surgical portion and the like, and thus, for example, it is possible for the surgical operator to easily confirm the surgical portion and the like. Furthermore, here, the endoscopic surgery system has been described as an example, but the technology according to this disclosure, for example, may be applied to a microscopic surgery system and the like.

A set of processings described herein can be executed by hardware, software, or a composite configuration thereof. In a case where the processing is executed by the software, a program in which a processing sequence is recorded is executed by being installed in a memory of a computer incorporated into dedicated hardware. Alternatively, the program can be executed by being installed in a general-purpose computer that is capable of executing various processings.

For example, the program can be recorded in advance in a hard disk, a solid state drive (SSD), and a read only memory (ROM), as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-Ray disc (BD, Registered Trademark), a magnetic disk, and a semiconductor memory card. Such a removable recording medium can be provided as a so-called package software.

In addition, the program may be installed in the computer from the removable recording medium, or may be transmitted to the computer from a download site in a wireless or wired manner through a network such as a local area network (LAN) or the internet. The computer is capable of receiving the program that is transmitted as described above, and is capable of installing the program in a recording medium such as a built-in hard disk.

Furthermore, the effects described herein are merely illustrative, are not limited, and may have additional effects. In addition, the present technology should not be interpreted as being limited to the embodiments described above. The present technology is exemplarily disclosed in the embodiments of the present technology disclosed, and it is obvious that a person skilled in the art is capable of correcting or substituting the embodiments within a range not departing from the gist of the present technology. That is, in order to determine the gist of the present technology, the scope of the claims should be considered.

In addition, the photometric device of the present technology can also be configured as follows.

(1) A photometric device, including:

a subject region discrimination unit configured to discriminate a desired subject region on the basis of ranging information for each ranging region;

a subject photometric region setting unit configured to set a subject photometric region by performing image signal processing of the subject region; and a photometric value calculation unit configured to calculate a photometric value of the desired subject region by using a photometric value of the subject photometric region set by the subject photometric region setting unit.

(2) The photometric device according to (1), in which the subject photometric region setting unit covers the desired subject region by the image signal processing, and sets a photometric region corresponding to the subject region after the covering to the subject photometric region.

(3) The photometric device according to (2), in which the subject photometric region setting unit performs closing processing as the image signal processing, and performs reduction processing after performing expansion processing to cover the desired subject region.

(4) The photometric device according to (2), in which the subject photometric region setting unit performs replacement processing of setting a region having a number of regions of greater than or equal to a threshold value in which a peripheral region includes the subject region in a non-subject region not including the subject region, to the subject region as the image signal processing, and sets a photometric region corresponding to the subject region after the replacement processing to the subject photometric region.

(5) The photometric device according to (2), in which the subject photometric region setting unit performs replacement processing of setting a non-subject region of less than or equal to a predetermined number of regions, the non-subject region being positioned between the subject regions in a predetermined direction and not including the subject region, to the subject region as the image signal processing, and sets a photometric region corresponding to the subject region after the replacement processing to the subject photometric region.

(6) The photometric device according to any one of (1) to (5), in which the subject photometric region setting unit sets the subject photometric region on the basis of a subject recognition result of a captured image including the desired subject and a discrimination result of the subject region.

(7) The photometric device according to any one of (1) to (6), in which the photometric value calculation unit performs weighting with respect to the photometric value of the subject photometric region according to a position in the subject photometric region, and calculates the photometric value of the desired subject region by using the photometric value after the weighting.

(8) The photometric device according to (7), in which the subject photometric region setting unit sets a photometric region corresponding to a subject region covering the desired subject region to the subject photometric region, and the photometric value calculation unit sets weight of a photometric value of a photometric region in which all peripheral photometric regions include a photometric region of the subject photometric region to be higher than that of other photometric regions, as the weighting.

(9) The photometric device according to any one of (1) to (8), in which in a case where a ranging region set to be in a focusing state is designated, the photometric value calculation unit performs weighting of setting weight of a photometric value of a predetermined region range based on a photometric region corresponding to the designated ranging region, and calculates the photometric value of the desired subject region by using the photometric value after the weighting.

(10) The photometric device according to any one of (1) to (9), in which the photometric value calculation unit performs weighting of setting weight of a characteristic portion of the desired subject to be high, with respect to the photometric value of the subject photometric region on the basis of a subject recognition result of a captured image including the desired subject, and calculates the photometric value of the desired subject by using the photometric value after the weighting.

(11) The photometric device according to any one of (1) to (10), in which the subject region discrimination unit discriminates a region in a focusing state as the subject region on the basis of the ranging information.

(12) The photometric device according to any one of (1) to (11), in which the subject region discrimination unit discriminates a face region as the desired subject region.

INDUSTRIAL APPLICABILITY

In the photometric device, the photometric method, the program, and the capturing device of the present technology, the desired subject region is discriminated by the subject region discrimination unit, on the basis of the ranging information, and the subject photometric region is set by the subject photometric region setting unit, according to the image signal processing of the discriminated desired subject region. In addition, the photometric value of the desired subject region is calculated by the photometric value calculation unit by using the photometric value of the subject photometric region set by the subject photometric region setting unit. For this reason, it is possible to accurately acquire the photometric value with respect to the desired subject region, and thus, it is possible to perform optimal exposure control with respect to the desired subject region by using the photometric value that is calculated by the photometric value calculation unit. Therefore, the present technology can be applied to a machine provided with a capturing function, for example, a digital camera or a video camera, a mobile terminal device such as a smart phone, a monitoring camera, an in-vehicle camera, and the like.

REFERENCE SIGNS LIST

10 Photometric device
11, 31 Subject region discrimination unit
12, 32, 32a Subject photometric region setting unit
13, 33, 33a Photometric value calculation unit
20, 20a Capturing device
21 Imaging optical system
22 Imaging unit
23 Photometric unit
24 Ranging unit
25 Subject recognition unit
30, 30a Control unit
34 Full-screen photometric value calculation unit
35 Exposure control unit
41 Camera signal processing unit
42 Display unit
43 Recording unit
44 User interface (I/F) unit

The invention claimed is:

1. A photometric device, comprising:
a memory storing program code, and
a processor configured to execute the program code to perform operations comprising:
subject region discrimination that including discriminating a subject region on a basis of ranging information;
subject photometric region setting that includes setting a subject photometric region by performing image signal processing of the subject region, the subject photometric region setting including identifying an initial subject region corresponding to a subject, the initial subject region being composed of image components determined to correspond to the subject, the subject photometric region setting further including a covering operation that alters the number of image components of the initial subject region in determining the desired subject region for the subject; and photometric value calculation that includes calculating a photometric value of the desired subject region by using a photometric value of the subject photometric region set in the subject photometric region setting.

2. The photometric device according to claim 1,
wherein the subject photometric region setting includes performing closing processing as the image signal processing, and performing reduction processing after performing expansion processing to cover the desired subject region.

3. The photometric device according to claim 1,
wherein the subject photometric region setting includes performing replacement processing of setting a region having a number of regions of greater than or equal to a threshold value in which a peripheral region includes the desired subject region in a non-subject region not including the desired subject region, to the desired subject region as the image signal processing, and sets a photometric region corresponding to the desired subject region after the replacement processing to the subject photometric region.

4. The photometric device according to claim 1,
wherein the subject photometric region setting includes performing replacement processing of setting a non-subject region of less than or equal to a predetermined number of regions, the non-subject region being positioned between the subject regions in a predetermined direction and not including the desired subject region, to the desired subject region as the image signal processing, and sets a photometric region corresponding to the desired subject region after the replacement processing to the subject photometric region.

5. The photometric device according to claim 1,
wherein the subject photometric region setting includes setting the subject photometric region on a basis of a subject recognition result of a captured image including the subject and a discrimination result of the desired subject region.

6. The photometric device according to claim 1,
wherein the photometric value calculation includes weighting with respect to the photometric value of the subject photometric region according to a position in the subject photometric region, and calculates the photometric value of the desired subject region by using the photometric value after the weighting.

7. The photometric device according to claim 6,
wherein the photometric value calculation includes setting a weight of a photometric value of a photometric region in which all peripheral photometric regions include a photometric region of the subject photometric region to be higher than that of other photometric regions, as the weighting.

8. The photometric device according to claim 1,
wherein in a case where a ranging region set to be in a focusing state is designated, the photometric value calculation includes weighting of setting weight of a photometric value of a predetermined region range based on a photometric region corresponding to the designated ranging region, and calculates the photometric value of the desired subject region by using the photometric value after the weighting.

9. The photometric device according to claim 1,
wherein the photometric value calculation includes weighting of setting weight of a characteristic portion of the desired subject region to be high, with respect to the photometric value of the subject photometric region on a basis of a subject recognition result of a captured image including the desired subject region, and calculates the photometric value of the desired subject region by using the photometric value after the weighting.

10. The photometric device according to claim 1,
wherein the subject region discrimination includes discriminating a region in a focusing state as the subject region on a basis of the ranging information.

11. The photometric device according to claim 1,
wherein the subject region discrimination includes discriminating a face region in furthering the determination of the desired subject region.

12. A photometric method, comprising:
subject region discrimination processing that discriminates a subject region on a basis of ranging information;
subject photometric region setting processing that sets a subject photometric region by performing image signal processing of the subject region, the subject photometric region setting including identifying an initial subject region corresponding to a subject, the initial subject region being composed of image components determined to correspond to the subject, the subject photometric region setting further including a covering operation that alters the number of image components of the initial subject region in determining the desired subject region for the subject; and
photometric value calculation processing that calculates a photometric value of the desired subject region by using a photometric value of the subject photometric region set in the subject photometric region setting.

13. The photometric method according to claim 12,
wherein the subject photometric region setting processing includes performing closing processing as the image signal processing, and performing reduction processing after performing expansion processing to cover the desired subject region.

14. The photometric method according to claim 12,
wherein the subject photometric region setting includes performing replacement processing of setting a region having a number of regions of greater than or equal to a threshold value in which a peripheral region includes the desired subject region in a non-subject region not including the desired subject region, to the desired subject region as the image signal processing, and sets a photometric region corresponding to the desired subject region after the replacement processing to the subject photometric region.

15. The photometric method according to claim 12,
wherein the subject photometric region setting includes performing replacement processing of setting a non-subject region of less than or equal to a predetermined number of regions, the non-subject region being positioned between the subject regions in a predetermined direction and not including the desired subject region, to the desired subject region as the image signal processing, and sets a photometric region corresponding to the desired subject region after the replacement processing to the subject photometric region.

16. A non-transitory computer readable medium storing program code for calculating a photometric value, the program code being executable by a computer to performing operations comprising:
subject region discrimination processing that discriminates a subject region on a basis of ranging information;

subject photometric region setting processing that sets a subject photometric region by performing image signal processing of the subject region, the subject photometric region setting including identifying an initial subject region corresponding to a subject, the initial subject region being composed of image components determined to correspond to the subject, the subject photometric region setting further including a covering operation that alters the number of image components of the initial subject region in determining the desired subject region for the subject; and photometric value calculation processing that calculates a photometric value of the desired subject region by using a photometric value of the subject photometric region set in the subject photometric region setting.

17. The non-transitory computer readable medium according to claim 16, wherein the subject photometric region setting processing includes performing closing processing as the image signal processing, and performing reduction processing after performing expansion processing to cover the desired subject region.

18. The non-transitory computer readable medium according to claim 16, wherein the subject photometric region setting processing includes performing replacement processing of setting a region having a number of regions of greater than or equal to a threshold value in which a peripheral region includes the desired subject region in a non-subject region not including the desired subject region, to the desired subject region as the image signal processing, and sets a photometric region corresponding to the desired subject region after the replacement processing to the subject photometric region.

19. The non-transitory computer readable medium according to claim 16, wherein the subject photometric region setting processing includes performing replacement processing of setting a non-subject region of less than or equal to a predetermined number of regions, the non-subject region being positioned between the subject regions in a predetermined direction and not including the desired subject region, to the desired subject region as the image signal processing, and sets a photometric region corresponding to the desired subject region after the replacement processing to the subject photometric region.

20. An image capturing device, comprising:

a ranger configured to generate ranging information indicating ranging results for ranging regions, a memory storing program code, and a processor configured to execute the program code to perform operations comprising:

subject region discrimination that discriminates a subject region on a basis of the ranging information;

subject photometric region setting that sets a subject photometric region by performing image signal processing of the subject region, the subject photometric region setting including identifying an initial subject region corresponding to a subject, the initial subject region being composed of image components determined to correspond to the subject, the subject photometric region setting further including a covering operation that alters the number of image components of the initial subject region in determining the desired subject region for the subject; and photometric value calculation that calculates a photometric value of the desired subject region by using a photometric value of the subject photometric region set in the subject photometric region setting.

* * * * *